United States Patent
Olson et al.

(10) Patent No.: US 12,345,360 B2
(45) Date of Patent: Jul. 1, 2025

(54) SYSTEMS AND METHODS FOR SPRINKLER SYSTEMS WITH FLEXIBLE HOSE AND RAPID SEAL ADAPTER

(71) Applicant: Tyco Fire Products LP, Cranston, RI (US)

(72) Inventors: Timothy J. Olson, Cranston, RI (US); Jeremy Cogswell, Johnston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/380,007

(22) Filed: Oct. 13, 2023

(65) Prior Publication Data

US 2024/0035602 A1 Feb. 1, 2024

Related U.S. Application Data

(63) Continuation of application No. 18/258,506, filed as application No. PCT/US2022/019197 on Mar. 7, 2022.

(60) Provisional application No. 63/158,217, filed on Mar. 8, 2021.

(51) Int. Cl.
*F16L 33/24* (2006.01)
*A62C 35/68* (2006.01)
*A62C 37/48* (2006.01)
*F16L 25/00* (2006.01)

(52) U.S. Cl.
CPC .............. *F16L 33/24* (2013.01); *A62C 35/68* (2013.01); *A62C 37/48* (2013.01); *F16L 25/0036* (2013.01)

(58) Field of Classification Search
CPC ......... F16L 33/24; F16L 5/04; F16L 25/0036; F16L 41/08; F16L 41/14; F16L 11/15; F16L 11/11; F16L 33/26; F16L 33/34; F16L 19/0212
See application file for complete search history.

(56) References Cited

U.S. PATENT DOCUMENTS

| | | | |
|---|---|---|---|
| 2,702,201 A | | 2/1955 | Romanelli et al. |
| 2,722,437 A | | 11/1955 | Philips |
| 4,089,351 A | * | 5/1978 | Ward ...................... F16L 11/15 |
| 4,220,208 A | * | 9/1980 | Jackson |
| 4,717,099 A | | 1/1988 | Hubbard |

(Continued)

FOREIGN PATENT DOCUMENTS

| AU | 2017277779 A1 | 12/2018 |
|---|---|---|
| CA | 3026513 A1 | 12/2017 |

(Continued)

OTHER PUBLICATIONS

WO-2007105313-A1—Machine Translation—English (Year: 2007).*

(Continued)

*Primary Examiner* — William S. Choi
(74) *Attorney, Agent, or Firm* — Foley & Lardner LLP

(57) ABSTRACT

A sprinkler system includes a fitting and a sprinkler. The fitting includes a hose and at least one adapter coupled with the hose. The at least one adapter includes a first engagement member and a receiver adjacent to the first engagement member. The receiver has a greater inner diameter than the first engagement member. The sprinkler includes a body, at least one flange extending from the body, and a second engagement member extending from the at least one flange.

16 Claims, 14 Drawing Sheets

(56) References Cited

U.S. PATENT DOCUMENTS

| | | | |
|---|---|---|---|
| 4,905,766 A | 3/1990 | Dietz et al. | |
| 5,109,929 A | 5/1992 | Spears | |
| 5,327,976 A | 7/1994 | Hattori | |
| 5,622,341 A | 4/1997 | Stana | |
| 6,260,810 B1 | 7/2001 | Choi | |
| 6,811,130 B1 | 11/2004 | Oh | |
| 6,907,938 B2 | 6/2005 | MacDonald et al. | |
| 7,059,612 B2 * | 6/2006 | Kuribayashi | |
| 7,240,884 B2 | 7/2007 | Shim | |
| 7,255,315 B2 | 8/2007 | Oh | |
| 7,296,634 B2 | 11/2007 | MacDonald et al. | |
| 7,735,787 B2 | 6/2010 | Kafenshtok et al. | |
| 7,784,746 B2 | 8/2010 | Kafenshtok et al. | |
| 7,845,599 B2 | 12/2010 | Jackson | |
| 7,878,464 B2 | 2/2011 | Oh | |
| 8,181,709 B2 | 5/2012 | Oh | |
| 8,297,663 B2 * | 10/2012 | Spears | |
| 8,336,920 B2 | 12/2012 | Stempo et al. | |
| 8,474,199 B2 | 7/2013 | Oh | |
| 8,500,079 B2 | 8/2013 | Oh | |
| 8,833,718 B2 | 9/2014 | Oh | |
| 8,833,719 B2 | 9/2014 | Lim | |
| D724,187 S | 3/2015 | Savage et al. | |
| 9,004,421 B2 | 4/2015 | Feenstra | |
| D728,756 S | 5/2015 | Savage et al. | |
| 9,174,077 B2 | 11/2015 | Lim | |
| 9,255,652 B2 | 2/2016 | Kim | |
| 9,278,238 B2 | 3/2016 | Thau et al. | |
| 9,320,930 B2 | 4/2016 | Abels et al. | |
| 9,339,673 B2 | 5/2016 | Shipman | |
| 9,341,286 B1 | 5/2016 | Oh | |
| 9,345,918 B2 | 5/2016 | Bucher et al. | |
| 9,358,411 B2 | 6/2016 | Shipman | |
| 9,375,594 B2 | 6/2016 | Stempo et al. | |
| 9,415,250 B2 | 8/2016 | Bucher et al. | |
| 9,511,248 B2 | 12/2016 | Szentimrey et al. | |
| 9,709,202 B2 * | 7/2017 | Spears | |
| 9,718,076 B2 | 8/2017 | Oh | |
| 9,889,327 B2 | 2/2018 | Mitchell et al. | |
| 9,999,793 B2 | 6/2018 | Multer | |
| 10,010,730 B2 | 7/2018 | Abels et al. | |
| 10,010,731 B1 | 7/2018 | Beagen et al. | |
| 10,016,644 B2 | 7/2018 | Seo et al. | |
| 10,143,872 B2 | 12/2018 | Shipman | |
| 10,173,088 B2 | 1/2019 | Chong | |
| 10,265,560 B2 | 4/2019 | Polan | |
| 10,279,367 B2 | 5/2019 | Dafonseca et al. | |
| 10,328,296 B2 | 6/2019 | Chong | |
| 10,335,621 B2 | 7/2019 | Polan | |
| 10,426,985 B2 | 10/2019 | Beagen et al. | |
| 10,426,986 B2 | 10/2019 | Chong | |
| 10,449,402 B2 | 10/2019 | Bucher et al. | |
| 10,478,650 B2 | 11/2019 | Stempo et al. | |
| 10,646,736 B2 | 5/2020 | Meyer et al. | |
| 10,653,908 B2 | 5/2020 | Meyer et al. | |
| 10,744,527 B2 * | 8/2020 | Jackson | |
| 10,753,513 B2 | 8/2020 | Jung | |
| 10,850,144 B2 | 12/2020 | Meyer et al. | |
| 10,981,189 B2 | 4/2021 | Beagen | |
| 11,083,920 B2 | 8/2021 | Multer | |
| 11,383,262 B2 | 7/2022 | Dafonseca et al. | |
| 2003/0075343 A1 * | 4/2003 | Ballard | |
| 2007/0296212 A1 * | 12/2007 | Schwarz | |
| 2011/0094760 A1 | 4/2011 | Im | |
| 2013/0037281 A1 * | 2/2013 | Szentimrey | |
| 2013/0284862 A1 | 10/2013 | Lim | |
| 2014/0151514 A1 * | 6/2014 | Asai | |
| 2014/0174768 A1 * | 6/2014 | Bucher | |
| 2019/0175968 A1 | 6/2019 | Pressnell | |
| 2019/0262853 A1 | 8/2019 | Dafonseca et al. | |
| 2019/0374802 A1 | 12/2019 | Coletta et al. | |
| 2020/0278055 A1 * | 9/2020 | Zaborszki | F16L 25/0036 |
| 2020/0330807 A1 | 10/2020 | Silva et al. | |
| 2023/0001248 A1 | 1/2023 | Cogswell | |
| 2023/0108242 A1 | 4/2023 | Cogswell | |

FOREIGN PATENT DOCUMENTS

| | | | |
|---|---|---|---|
| CN | 106764148 A | 5/2017 | |
| CN | 110446534 A | 11/2019 | |
| DE | 10 2005 054 161 | 5/2007 | |
| EP | 1978289 B1 * | 5/2010 | F16L 5/10 |
| EP | 2 956 701 A1 | 12/2015 | |
| EP | 3 468 676 A1 | 4/2019 | |
| EP | 3 561 353 A1 | 10/2019 | |
| EP | 3 562 563 A1 | 11/2019 | |
| EP | 3 651 866 A1 | 5/2020 | |
| JP | H06-307580 A | 11/1994 | |
| JP | H07-004567 A | 1/1995 | |
| JP | H08-038641 A | 2/1996 | |
| JP | H11-063310 A | 3/1999 | |
| JP | 3195220 B2 | 8/2001 | |
| JP | 3383477 B2 | 3/2003 | |
| JP | 2009-243583 A | 10/2009 | |
| JP | 2017-023501 A | 2/2017 | |
| KR | 20-0415188 Y1 | 5/2006 | |
| KR | 20120098205 | 9/2012 | |
| KR | 101346722 B1 | 12/2013 | |
| KR | 10-2020-0085569 A | 7/2020 | |
| KR | 102323825 B1 | 11/2021 | |
| WO | WO-2007105313 A1 * | 9/2007 | F16L 11/11 |
| WO | WO-2017/214418 A1 | 12/2017 | |
| WO | WO-2018/152804 A1 | 8/2018 | |
| WO | WO-2019/051235 A1 | 3/2019 | |
| WO | WO-2019/051279 A1 | 3/2019 | |
| WO | WO-2021/003153 A1 | 1/2021 | |

OTHER PUBLICATIONS

EP-1978289-B1—Machine Translation—English (Year: 2010).*
European Patent Office as International Searching Authority; International Search Report and Written Opinion; International Application No. PCT/US2022/019197; mailed Jun. 21, 2022; 14 pages.
International Search Report and Written Opinion for PCT Appl. Ser. No. PCT/IB2025/050084 dated Apr. 14, 2025 (11 pages).

* cited by examiner

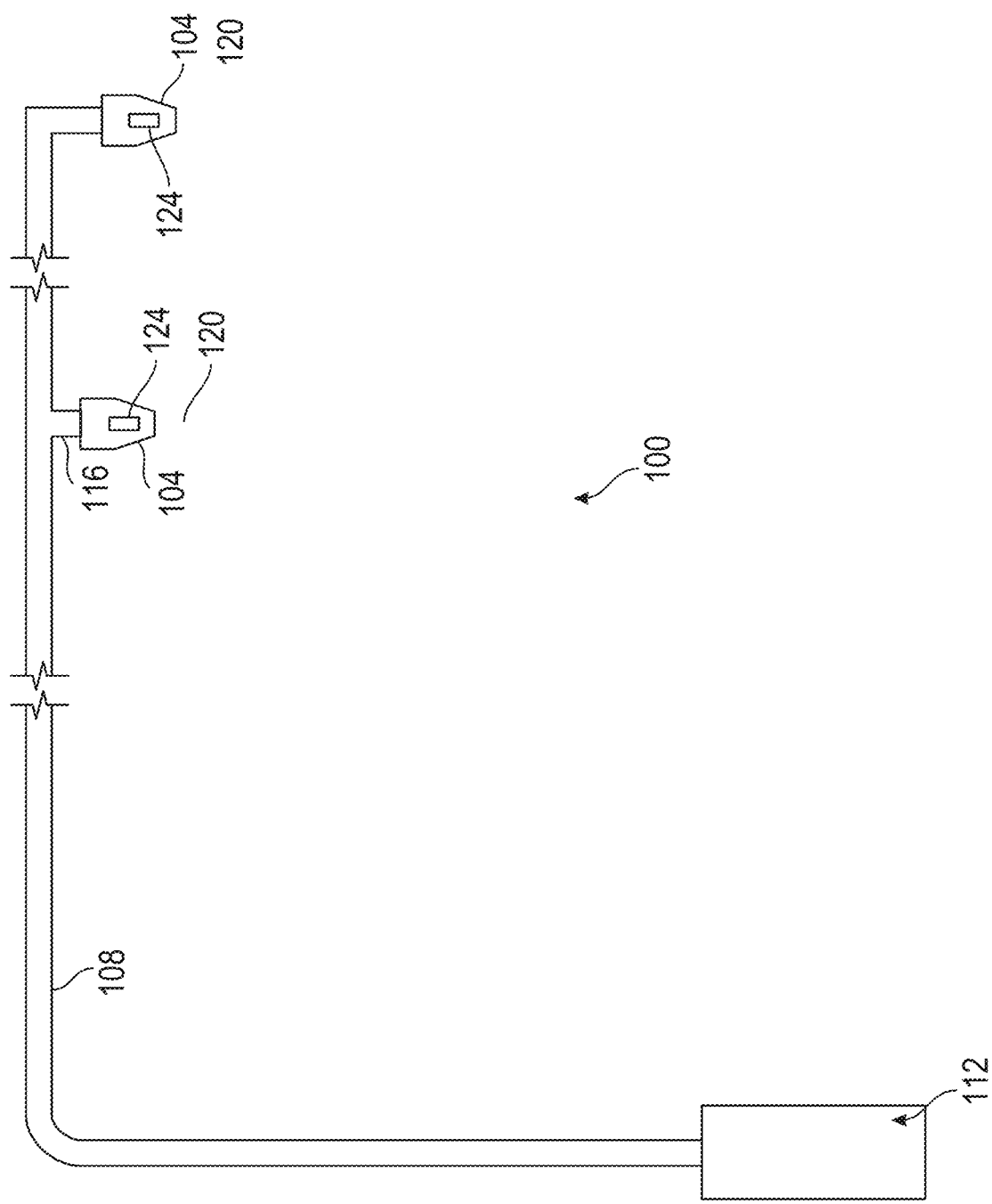

SYSTEMS AND METHODS FOR SPRINKLER SYSTEMS WITH FLEXIBLE HOSE AND RAPID SEAL ADAPTER

CROSS-REFERENCE TO RELATED APPLICATIONS

The present application is a continuation of U.S. patent application Ser. No. 18/258,506, filed Jun. 20, 2023, which is a national stage application of International Application No. PCT/US2022/019197, filed Mar. 7, 2022, which claims the benefit of and priority to U.S. Provisional Application No. 63/158,217, filed Mar. 8, 2021, the disclosure of which is incorporated herein by reference in its entirety.

BACKGROUND

Sprinkler systems can be provided in buildings to address fire conditions. Sprinkler systems can include fire protection sprinklers that connect with piping systems to receive fluid to address the fire conditions.

SUMMARY

At least one aspect relates to a sprinkler system. The sprinkler system includes a fitting and a sprinkler. The fitting includes a hose and at least one adapter coupled with the hose. The at least one adapter includes a first engagement member and a receiver adjacent to the first engagement member. The receiver has a greater inner diameter than the first engagement member. The sprinkler includes a body, at least one flange extending from the body, and a second engagement member extending from the at least one flange.

At least one aspect relates to a flexible hose fitting. The flexible hose fitting includes a hose and at least one adapter coupled with the hose. The at least one adapter includes a first engagement member and a receiver adjacent to the first engagement member. The receiver has a greater inner diameter than the first engagement member.

At least one aspect relates to a piping assembly of a sprinkler system. The piping assembly includes a first fitting, a second fitting, and a gasket. The first fitting includes a hose and at least one adapter coupled with the hose. The at least one adapter includes a first engagement member and a receiver adjacent to the first engagement member. The receiver has a greater inner diameter than the first engagement member. The second fitting includes a body, at least one flange extending from the body, and a second engagement member extending from the at least one flange. The gasket is to be positioned between the gasket receiver and the receiver of the fitting.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

FIG. 1 depicts an example of a sprinkler system.

The accompanying drawings are not intended to be drawn to scale. Like reference numbers and designations in the various drawings indicate like elements. For purposes of clarity, not every component can be labeled in every drawing. In the drawings:

DETAILED DESCRIPTION

Figure 2A:
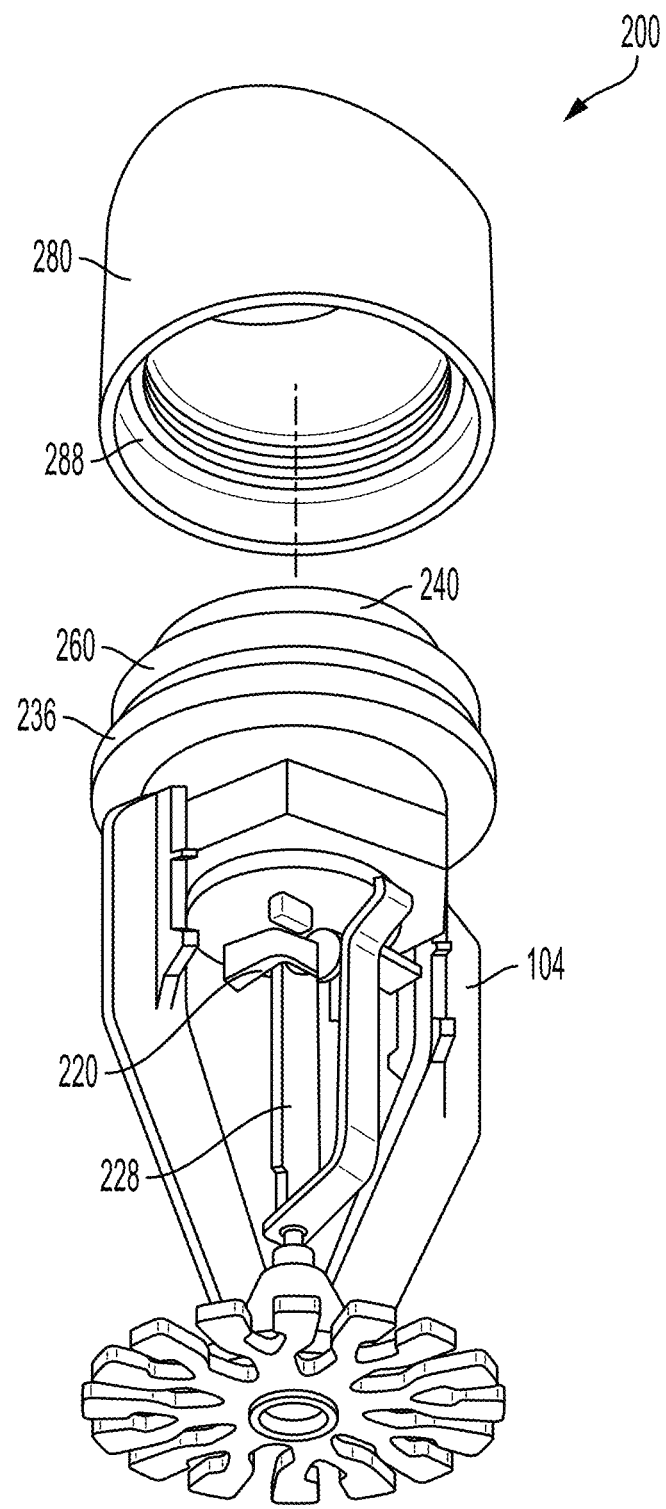
FIGS. 2A and 2B depict an example of a sprinkler, fitting, and gasket of a sprinkler system.

The present disclosure generally relates to fire sprinkler systems. More particularly, the present disclosure relates to a flexible hose that can be installed with various fittings, such as a sprinkler, with greater speed, such as by reducing or avoiding the need to use tools or pipe tape to properly connect and seal the sprinkler to the flexible hose, or otherwise enabling tool-free installation. Sprinkler systems include sprinklers that can inhibit or permit flow of fluid (water or other fire suppressant fluid). In the instance of a fire or detected conditions that may be indicative of a fire (e.g., increased heat, smoke, etc.), the sprinklers can permit the flow of fluid such that the fluid may contact a deflector and be dispersed so as to address the fire. The sprinklers may disperse water or fire protection fluid over a specific area, for example a storage commodity, a portion of a room or hallway, or a window or wall. In order to accomplish fire exposure protection for a given area (e.g., room, hallway, window, wall, etc.), sprinklers couple with a piping system that directs fire suppressant from a source to the sprinklers. The sprinklers can selectively couple with the piping during installation of the fire suppression system. For example, sprinklers include threading that can interface with threading on the piping system to fluidly seal the sprinklers to the piping system. Flexible hoses can be used to provide greater freedom for locating the sprinkler relating to the piping system, including to enable the sprinkler to be positioned on a different side of a barrier (e.g., wall) from the piping system or to enable the sprinkler to be installed through a drop ceiling, but can require difficult installation procedures that can expose the sprinkler to contact from other components or structures during installation.

Sprinkler systems in accordance with the present disclosure can include a sprinkler (or other fitting, such as a pipe, tee joint, elbow joint, cross joint, or pipe outlet, including threaded or grooved outlets or couplings) that includes a flange to stop insertion of the sprinkler into a fitting (e.g., adapter coupled with or formed as part of the flexible hose)

that receives the sprinkler, and a gasket that can be positioned between the sprinkler and fitting that includes dimples to provide an interference fit and a relief cut to decrease insertion forces. The sprinkler can include at least one of a flange and a shoulder that abuts the fitting to prevent overtightening to prevent deformation of the gasket. The system can implement particular sizes or ratios of features such as thread pitch, gasket height, and flange height to facilitate installation of the sprinkler. The flexible hose can be formed as part of an assembly or monolithic fitting including one or more adapters, such as adapters that allow for manual connection with the flexible hose (e.g., allowing for manual push or rotation connections while a fluid tight seal or other sufficiently secure connection is still formed), to allow for tool-free connection between the flexible hose and a pipe header at an inlet end of the flexible hose, and between the flexible hose and a sprinkler at an outlet end of the flexible hose. Various such features can enable a more rapid installation of the sprinkler while enabling proper sealing and preventing over torqueing, including to allow more flexible placement of the sprinkler without requiring an installer to manipulate tools overhead during the installation process.

For example, the sprinkler system can include a sprinkler, a fitting, and a gasket. The sprinkler can include a body having an inlet end and an opening. The sprinkler can be an early suppression fast response (ESFR) sprinkler, standard commercial sprinkler, residential sprinkler, or the like. The sprinkler can include at least one flange extending radially outward from the body and positioned between the inlet end and the opening. The at least one flange can be sized to receive the gasket between the at least one flange and the fitting, and to abut an outer edge of the fitting to prevent overtightening or overcompression of the gasket. The sprinkler can include a sprinkler engagement member, such as a straight thread, positioned between the at least one flange and the inlet end. The fitting can include an inner wall defining a fitting engagement member that couples with the sprinkler engagement member, an inner wall edge extending radially outward from the inner wall, and an end wall extending from the inner wall edge to the outer edge. The fitting can be made from a weldable material. The gasket can be received between the at least one flange, the end wall, and the inner wall edge to seal the sprinkler with the fitting. The gasket can be made from a material having a Shore hardness less than or equal to 80 durometers. The gasket can be made from a material having a Shore hardness greater than or equal to 50 and less than or equal to 60 durometers.

The sprinkler can be installed with fabricated (e.g., welded) steel piping systems. For example, the fitting can be welded to the steel piping, as the gasket is provided with (e.g., installed on) the sprinkler, rather than the fitting, and thus not in position to be deformed by the welding operation.

The sprinkler and various other components of the system can be used for storage applications, including but not limited to use for ceiling-only systems, and for ceiling heights up to and over fifty five feet. For example, the system can be used for storage commodities such as Class I, II, III or IV, Group A, Group B, or Group C plastics, elastomers, or rubber commodities, or any combination thereof. The storage commodity can be in an arrangement such as a single-row rack arrangement, a double-row rack arrangement, a multi-row rack arrangement, a palletized arrangement, a solid-piled arrangement, a bin box arrangement, a shelf arrangement, a back-to-back shelf arrangement, an on floor arrangement, and a rack without solid shelves arrangement, or any combination thereof. The system can be used in accordance with various standards, such as standards set forth by the National Fire Protection Association (NFPA) or FM Global. The sprinkler and various other components can also be used for residential and commercial fire suppression applications.

FIG. 1 depicts a fire suppression system 100. The fire suppression system 100 can be a chemical fire suppression system. The fire suppression system 100 can distribute a fire suppressant agent onto or nearby a fire, extinguishing the fire and preventing the fire from spreading. The fire suppression system 100 can be used alone or in combination with other types of fire suppression systems (e.g., a building sprinkler system, a handheld fire extinguisher). Multiple fire suppression systems 100 can be used in combination with one another to cover a larger area (e.g., each in different rooms of a building).

The fire suppression system 100 can be used in a variety of applications. The fire suppression system 100 can be used with a variety of fire suppressant agents, including but not limited to water (e.g., may use powders, liquids, foams, or other fluid or flowable materials). The fire suppression system 100 can be used for storage applications, including ceiling-only, in-rack, or a combination of ceiling and rack sprinklers, such as to be installed for storage commodities such as Class I, II, III or IV, Group A, Group B, or Group C plastics, elastomers, or rubber commodities, or any combination thereof. The storage commodity can be in an arrangement such as a single-row rack arrangement, a double-row rack arrangement, a multi-row rack arrangement, a palletized arrangement, a solid-piled arrangement, a bin box arrangement, a shelf arrangement, a back-to-back shelf arrangement, an on floor arrangement, and a rack without solid shelves arrangement, or any combination thereof.

The fire suppression system 100 can include or be coupled with a fluid supply 112. The fluid supply 112 can define an internal volume filled (e.g., partially filled, completely filled) with fire suppressant agent. The fluid supply 112 can provide fluid from a remote or local location to a building in which the fire suppression system 100 is located. The fluid supply may include, for example, a municipal water supply, pump, piping system, tank, cylinder, or any other source of water or fire suppression agent.

Piping 108 (e.g., one or more pipes, tubes, conduits) can be fluidly coupled with one or more sprinklers 104. The piping 108 can include vertical pipes 116. The vertical pipes 116 can extend perpendicular from the piping 108. The sprinklers 104 can receive water or other fire suppressant agent from the fluid supply 112 via the piping 108 and the vertical pipes 116. The sprinklers 104 can each define one or more outlets, through which the fire suppressant agent exits and contacts a deflector 120, such as to form a spray of water or other fire suppressant agent that covers a desired area. The sprays from the sprinklers 104 then suppress or extinguish fire within that area. The deflectors 120 of the sprinklers 104 can be shaped to control the spray pattern of the fire suppressant agent leaving the sprinklers 104. The sprinklers 104 can be used as concealed sprinklers, pendent sprinklers, upright sprinklers, water mist nozzles, or any other device for spraying fire suppression agent.

The sprinklers 104 can include an activation element (e.g., thermal element) 124. The activation element 124 can change from a first state that prevents fluid flow out of the sprinkler 104 to a second state that permits fluid flow of the sprinkler 104 responsive to a fire condition. For example, the activation element 124 can include a glass bulb including a fluid that expands responsive to an increase in temperature (e.g., responsive to heat provided to the fluid from a fire), such as to cause the glass bulb to break responsive to the temperature meeting or exceeding a threshold temperature; the activation element 124 can include a fusible link that includes two or more pieces coupled using a solder than can melt responsive to the temperature meeting or exceeding a threshold temperature; the activation element 124 can include an electric actuator (e.g., an electrically triggered pyrotechnic actuator or electrically actuated bulb or link). The activation element 124 can have a response time index (RTI) less than or equal to 80 $(m/s)^{1/2}$, or less than or equal to 50 $(m/s)^{1/2}$.

The sprinklers 104 can be early suppression, fast response (ESFR) sprinklers. The sprinklers 104 can have K-factors greater than or equal to 14.0 $GPM/PSI^2$ and less than or equal to 36.0 $GPM/PSI^2$. The sprinklers 104 can be arranged (e.g., in a grid or tree arrangement over a storage commodity) to have sprinkler to sprinkler spacings greater than or equal to eight feet by eight feet and less than or equal to twelve feet by twelve feet. The sprinklers can be configured to be connected with a pipe in quick time. To achieve this, the pitch of engageable threads provided on these sprinklers is altered from the standard national pipe threads (NPT). Due to the alteration in the pitch of the engageable threads, the sprinklers can be installed in quick time and with less torque requirement as compared to other sprinklers having national pipe threads (NPT). Due to the different pitch of the engageable threads, the sprinklers may not be directly connected with a pipe or connectors having standard national pipe threads (NPT). The present disclosure discloses fittings elaborated in following paragraphs to facilitate connection between standard threads of pipe or connector with non-standard threads of the sprinklers or standard threads of other sprinklers with non-standard threads of pipe or connector which are specifically provided to be connected with sprinklers. The sprinklers can be early suppression, fast response (ESFR) sprinklers provided with non-standard (for example, non-NPT) engageable threads. The sprinklers 104 can also be standard commercial sprinklers, residential sprinklers, or the like.

Figure 2B:
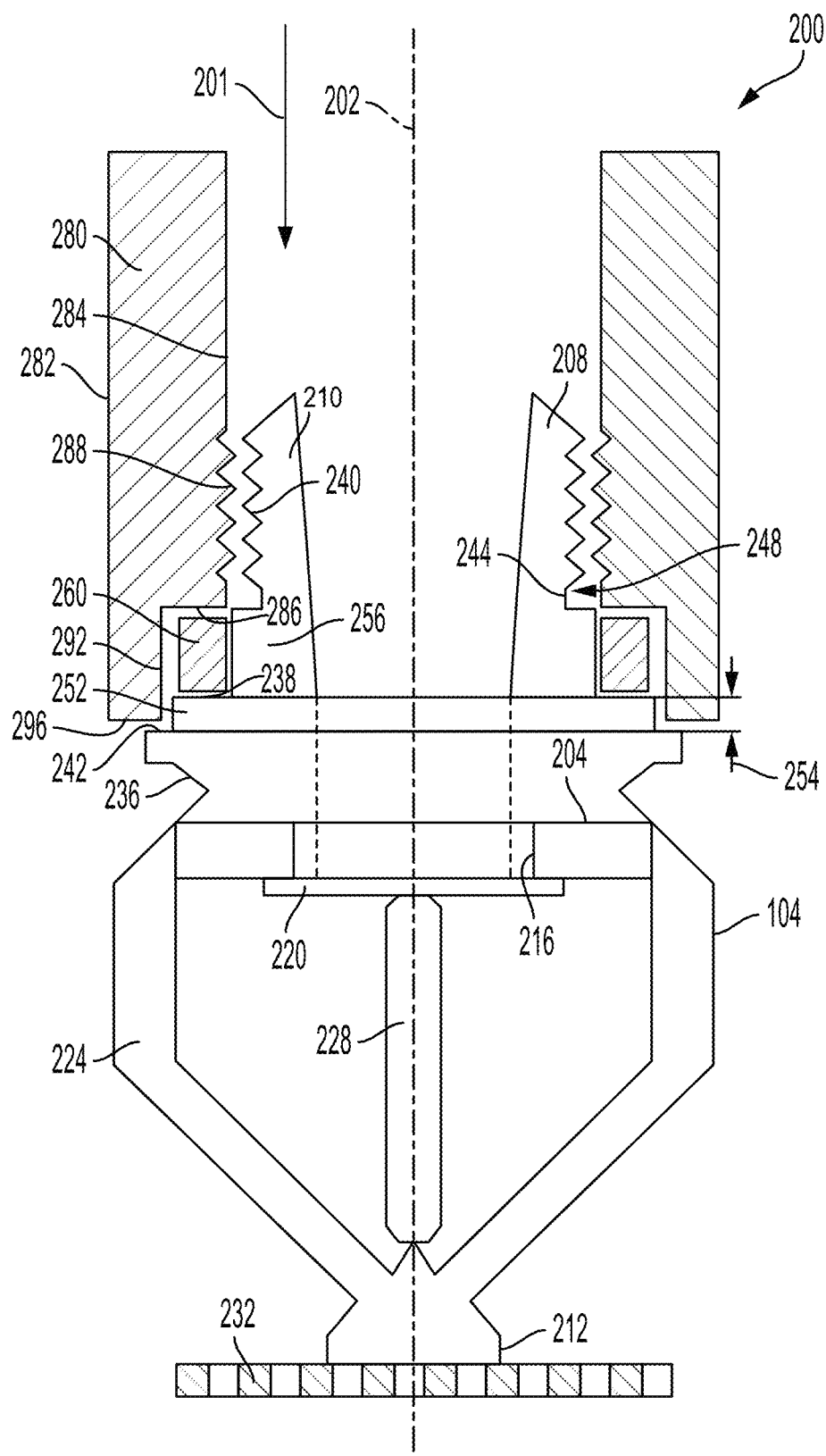

FIGS. 2A and 2B depict a sprinkler system 200. The sprinkler system 200 can incorporate features and components of the fire suppression system 100 described with reference to FIG. 1. The sprinkler system 200 can be used for fire protection in various applications, including but not limited to storage applications, commercial applications, and residential applications. The sprinkler system 200 can be rapidly assembled to properly install and seal the sprinkler 104, and may not require pipe tape to complete the seal, or may otherwise allow for a tool-free installation to complete the seal.

The sprinkler 104 can be coupled with a fitting 280 to receive fluid flow in a direction 201 from the fitting 280. The fitting 280 can be an adapter (including but not limited to a welded or strap-on pipe outlet, tee fitting, or elbow fitting) to couple the sprinkler 104 with a pipe, or can form an outlet portion of the pipe (e.g., at least one of pipe 108 and pipe 116 described with reference to FIG. 1). At least one of the sprinkler 104 and the fitting 280 can be made from a metal (e.g., steel, brass, iron), or a polymeric material (e.g., plastic, CPVC). For example, the fitting 280 can be made of a weldable metal, such as steel, brass, or iron. The fitting 280 can be at least one machined and molded as a unitary structure. The sprinkler 104 can be an example of a body that can be provided with the gasket 260 to couple with the fitting 280, such as a body that includes the at least one flange 236 (e.g., flanges 236 and 252) and the gasket receiver 256, to be connected with the fitting 280 by hand (e.g., without using tools). The gasket 260 can have various form factors, including but not limited to being a round or square gasket, as well as incorporating cutouts, dimples, or other features to facilitate effective sealing and coupling between the sprinkler 104 and fitting 280.

The fitting 280 can be welded to the piping 108 of FIG. 1. For example, the fitting 280 and piping 108 can be made of steel to be welded together. As described herein, the gasket 260 can be provided on the sprinkler 104, rather than in the fitting 280, so that the welding operation does not deform the gasket 260. In various examples, the gasket 260 can be arranged relative to at least one of the sprinkler 104 and the fitting 280 to form a radial seal (e.g., compression applied to the inner and outer diameters of the gasket 260) or a face seal (e.g., compression applied to a top and bottom of the cross section of the gasket 260).

The sprinkler 104 includes a body 204 that can extend from an inlet end 208 to an outlet end. The body 204 can define an opening 216 through which fluid can flow from the fitting 280. The sprinkler 104 can include a seal 220, such as a button that can be positioned in the opening 216 to seal the opening 216.

The sprinkler 104 can include at least one frame arm 224 that extends from the body 204. The frame arms 224 can extend to the outlet end. The frame arms 224 can be radially outward relative to the opening 216 (e.g., relative to longitudinal axis 202 extending through the opening 216).

The sprinkler 104 can include an activation element 228 positioned between the seal 220 and the outlet end. The activation element 228 can incorporate features of the activation element 124 described with reference to FIG. 1. For example, the activation element 228 can include a glass bulb within which a fluid can expand to break the glass bulb responsive to temperature meeting or exceeding a threshold temperature, or a fusible link that can break responsive to the temperature meeting or exceeding the threshold temperature. The activation element 228 can apply a force on the seal 220 to secure the seal 220 in the opening 216. Responsive to the activation element 228 breaking, the seal 220 can move out of the opening 216 (e.g., by pressure of fluid in the body 204 applied against the seal 220), allowing fluid from the fitting to flow through the opening 216.

The sprinkler 104 can include a deflector 232. The deflector 232 can receive fluid from the fitting 280 through the opening 216 (e.g., responsive to the seal 220 moving out of the opening 216) and output the received fluid according to a target spray pattern. For example, the deflector 232 can include one or more tines shaped to cause the fluid to be outputted according to the target spray pattern. The deflector 232 can extend from the frame arms 224 (or a portion of the sprinkler 104 between the frame arms 224 and the deflector 232). The target spray pattern can correspond to an orientation of the deflector 232 (e.g., relative to longitudinal axis 202).

The sprinkler 104 can include at least one flange 236 between the inlet end and the opening 216. The at least one flange 236 can define at least one support surface 238 that can contact the gasket 260 responsive to securing the sprinkler 104 with the fitting 280. The at least one flange 236 can form at least part of a neck portion of the sprinkler 104 that can be in contact with or received by the fitting 280.

The sprinkler 104 can include at least one engagement member 240 that can engage with the fitting 280. For example, as depicted in FIG. 2B, the at least one engagement member 240 can include threading that extends around the inlet end. The engagement member 240 can include straight thread, which can facilitate connection of the sprinkler 104 with the fitting 280.

The engagement member 240 can extend from the inlet end along a first portion 210 of the sprinkler 104 to a gap portion 244 that defines a gap 248 between the engagement member 240 and the at least one flange 236. The gap portion 244 can be radially inward from outer edges of the engagement member 240 and from the at least one flange 236 (e.g., from the second flange 252) relative to a longitudinal axis 202.

The fitting 280 can include an inner wall 284 that defines at least one fitting engagement member 288. The fitting engagement member 288 can couple with (e.g., threadably engage with) the engagement member 240 of the sprinkler 104 to secure the fitting 280 with the sprinkler 104. The fitting engagement member 288 can be straight thread. At least a portion of the fitting 280 can define the fitting engagement member 288. Responsive to engaging the sprinkler 104 with the fitting 280 (e.g., threading the sprinkler 104 into the fitting 280), the at least one flange 236 can apply pressure on the gasket 260 to seal the sprinkler 104 with the fitting 280, such as to compress the gasket 260 between the sprinkler 104 and the fitting 280.

The fitting 280 can include an end wall 292 radially outward from the inner wall 284 (as depicted in FIG. 2B, an outer surface of 282 the fitting 280 opposite the inner wall 284 and end wall 292 can be continuous, having the same outer radius). The inner wall 284 can define an inner wall edge 286 (e.g., shelf) between the inner wall 284 and the end wall 292. The inner wall edge 286 can be opposite the at least one support surface 238 of the at least one flange 236 while the sprinkler 104 is received by the fitting 280. The end wall 292 and the at least one flange 236 of the sprinkler 104 can receive the gasket 260 so that the gasket 260 seals the sprinkler 104 and the fitting 280. For example, the gasket 260 can be received between the inner wall edge 286 and the end wall 292 of the fitting 280 and the support surface 238 and gasket receiver 256 of the sprinkler 104, such that engagement of the sprinkler 104 and the fitting 280 (e.g., using engagement members 240, 280) compresses the gasket 260 between the inner wall edge 286 and the support surface 238. As discussed below, an outer edge 296 of the end wall 292 can contact the at least one flange 236 of the sprinkler 104, enabling the at least one flange 236 to stop further movement of the sprinkler 104 into the fitting 280 (e.g., in a direction along longitudinal axis 202), such as to prevent overtightening of the sprinkler 104 with the fitting 280 and prevent overcompression of the gasket 260. The fitting 280 and sprinkler 104 can position the gasket 260 so that the gasket 260 is not in a flow path through the fitting 280 and the body 204.

The at least one flange 236 can include a first flange 236, a second flange 252, and a gasket receiver 256. The first flange 236 can extend further radially outward (e.g., has a greater outer diameter than) than the second flange 252 so that a support surface 242 of the first flange 236 contacts the outer edge 296 of the fitting 280. The second flange 252 can extend further radially outward than (e.g., has a greater outer diameter than) the gasket receiver 256, and can contact the gasket 260 (e.g., a sprinkler 104—facing portion of the gasket 260). The gasket receiver 256 can contact the gasket 260, allowing the gasket 260 to be retained on the gasket receiver 256 during installation as shown in FIG. 2A.

Figure 3:
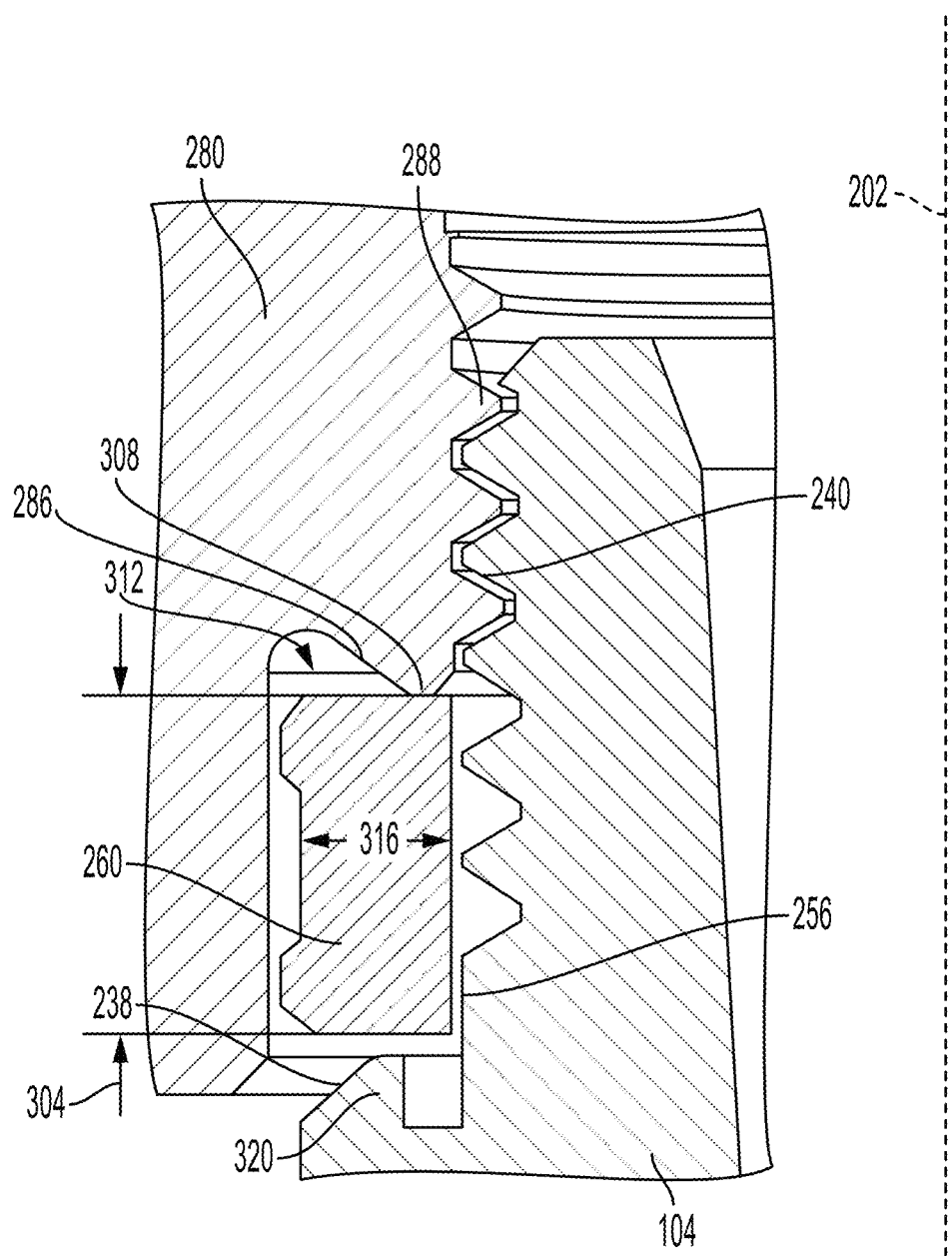
FIG. 3 depicts an example of a detail view of a sprinkler, fitting, and gasket of a sprinkler system.

FIG. 3 depicts the sprinkler 104 coupled with the gasket 260 and the fitting 280. Various features of at least one of the sprinkler 104, gasket 260, and fitting 280 can be sized to facilitate rapid installation of the sprinkler 104 with proper sealing and alignment, such as to ensure that half or full turns (e.g., rotation within a threshold angle of three hundred sixty degrees, the threshold angle can be ten degrees) of the sprinkler 104 when threaded into the fitting 280 properly compress the gasket 260 and align the frame arms 224 (and, in turn, the deflector 232) at a target orientation.

For example, at least one of a height 254 of the second flange 252 (see FIG. 2B) and a pitch of the fitting engagement member 288 of the fitting can correspond to a height 304 of the gasket 260. The height 304 can be greater than 0.1 inches and less than 1 inch. The height 304 can be greater than 0.15 inches and less than 0.5 inches. The height 304 can be greater than 0.2 inches and less than 0.4 inches. The height 304 can be 0.237 inches.

The height 304 of the gasket 260 can define at least one of a minimum threshold and a maximum threshold, based on which features of at least one of the sprinkler 104 and the fitting 280 can be sized. The minimum threshold can correspond to a minimum engagement with the gasket 260 to enable sealing using the gasket 260 (e.g., to enable water tight sealing). The minimum threshold can be greater than ten percent and less than twenty percent of the height 304. The minimum threshold can be greater than twelve percent and less than eighteen percent of the height 304. The minimum threshold can be fifteen percent. For example, if the height 304 is 0.237 inches, then the minimum threshold can be fifteen percent of 0.237 inches, which is about 0.035 inches.

The thread pitch of the fitting engagement member 288 can correspond to the minimum threshold. For example, the thread pitch of the fitting engagement member 288 can be a lowest number of threads per inch such that a half turn (e.g., rotation within a threshold angle of one hundred eighty degrees around longitudinal axis 202, the threshold angle can be less than ten degrees) relative to the fitting engagement member 288 is greater than or equal to the minimum threshold.

For example, if the minimum threshold is 0.035 inches, the fitting engagement member 288 can have a pitch of fourteen threads per inch, which is about 0.07 inches per thread, such that a half turn of the sprinkler 104 will result in the fitting engagement member 288 engaging with 0.035 inches of the gasket 260, satisfying the minimum threshold. As another example, if the height 304 is 0.5 inches, fifteen percent of 0.5 inches is 0.075 inches, such that a pitch of the fitting engagement member 288 can be 6 threads per inch (0.16 inches per thread so that a half turn engages with 0.08 inches of the gasket 260).

The maximum threshold can correspond to a maximum engagement of the sprinkler 104 with the gasket 260 or the fitting 280, such as to ensure an appropriate amount of compression of the gasket 260 to seal the sprinkler 104 with the fitting 280 without overtightening or the components bottoming out with respect to one another (e.g., support surface 242 of the at least one flange 236 contacting outer edge 296 of the fitting 280). The maximum threshold is greater than the minimum threshold. The maximum threshold can be greater than or equal to twenty percent and less than or equal to sixty percent of the height 304. The maximum threshold can be greater than or equal to thirty percent and less than or equal to fifty percent of the height 304. The maximum threshold can be forty percent of the height 304. For example, if the height is 0.237 inches, then the maximum threshold can be forty percent of 0.237 inches, which is about 0.095 inches.

The height 254 of the second flange 252 can correspond to the maximum threshold. For example, the height 254 can be less than or equal to the maximum threshold. For example, if the maximum threshold is 0.095 inches, then the height 254 can be less than or equal to 0.095 inches. As another example, if the height 304 is 0.5 inches, forty percent of inches is 0.2 inches, such that the height 254 can be less than or equal to 0.2 inches.

Because the gasket 260 is shielded from fluid flow by the gasket receiver 256 and the engagement member 240, the gasket 260 can be relatively soft. For example, the gasket 260 can be made from ethylene propylene diene monomer (EPDM) rubber. The gasket 260 can have a hardness greater than or equal to 50 durometers (e.g., Shore durometer) and less than or equal to 60 durometers. As such, the hardness of the gasket 260 can be low enough to facilitate hand-tightening of the sprinkler 104 with the fitting 280 (e.g., compared to harder materials, such as having hardnesses of 70-90 durometers, which may be used for gaskets to be installed relative to the sprinkler and fitting so that compression of the gasket can cause the gasket to extend radially inward into the fluid flow, restricting the fluid flow), such as by reducing the force required to tighten the sprinkler 104, and high enough to transmit a sensation of contact between the gasket 260 and the fitting 280 to a user installing the sprinkler 104 (e.g., as compared to further softer materials that may make it difficult to detect contact between the gasket 260 and the fitting 280 while tightening).

The gasket 260 can be made of various shapes, such as cross-sectional shapes. For example, the gasket 260 can have circular or rectangular cross-sections.

The inner wall edge 286 can be flat, such as depicted in FIG. 2B. The inner wall edge 286 can define an extension 308 that extends from the inner wall 284 adjacent to a void 312 between the inner wall 284 and the end wall 292. The extension 308 can apply force against the gasket 260 using less surface area, which can help prevent a leak path forming around the gasket 260 when sealing the sprinkler 104 and the fitting 280. The extension 308 can extend parallel to the longitudinal axis 202 (see FIG. 2B) and from a radially inward portion of the inner wall 284 relative to the void 312.

The support surface 238 of the sprinkler 104 can define an extension 320 that extends from the at least one flange 236 to apply force against the gasket 260 using less surface area. The extension 320 can extend from the at least one flange 236 in a direction towards the engagement member 240 (e.g., parallel to the longitudinal axis 202).

Figure 4:
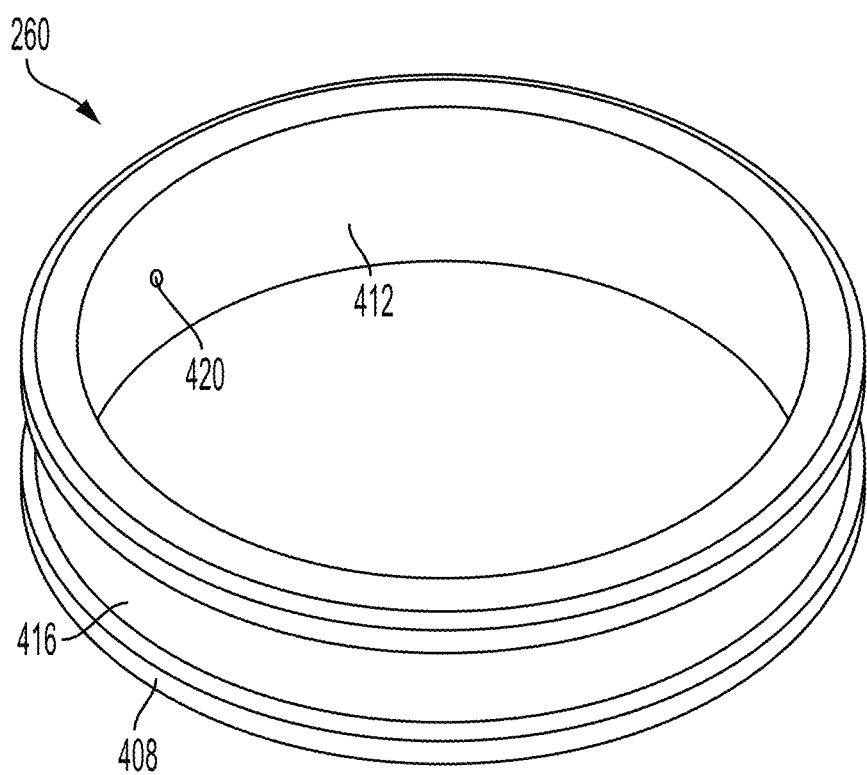
FIG. 4 depicts an example of a gasket of a sprinkler system.

FIG. 4 depicts an example of the gasket 260. The gasket 260 can include a wall 404 having an outer surface 408 and an inner surface 412. The outer surface 408 can define an insert portion 416 around a center of the wall 404 (e.g., a central region relative to the longitudinal axis 202 when the gasket 260 is received between the sprinkler 104 and fitting 280). The insert portion 416 can have a lesser thickness than a remainder of the wall 404 (see, e.g., thickness 316 defined by the insert portion 416 as depicted in FIG. 3). Responsive to compression, the wall 404 and outer surface 408 can bow outward to contact a fitting receiving the gasket 260 (e.g., to operate as a face seal). By providing the insert portion 416 with a lesser thickness, the gasket 260 can have a relief cut that can decrease insertion forces for coupling the sprinkler 104 with the fitting 280, which can facilitate toolless installation of the sprinkler 104. The gasket 260 can include a plurality of insert portions 1516 (e.g., defined by more than two relief cuts from outer surface 1508) to facilitate sealing and engagement with decreased insertion forces.

Figure 5:
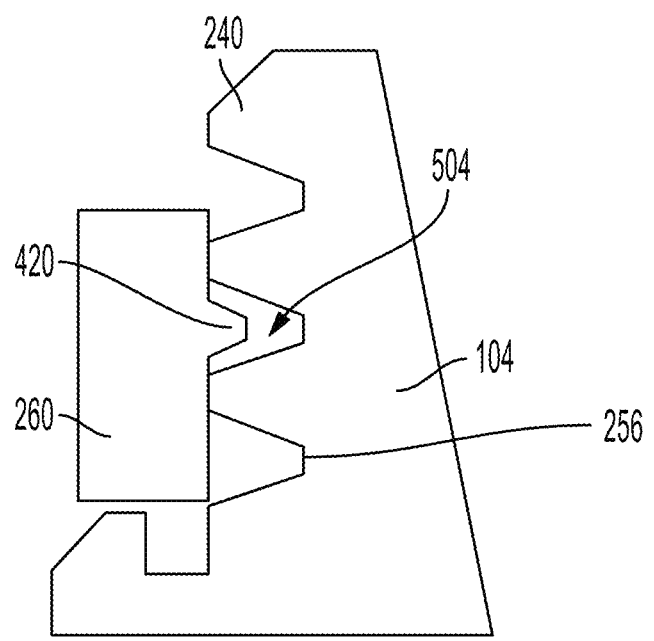
FIG. 5 depicts an example of a gasket and a sprinkler.

As depicted in FIG. 4 and FIGS. 5-7, the gasket 260 can include at least one extension 420 that extends radially inward from the inner surface 412. The extensions 420 can be bumps or dimples formed on the inner surface 412. The extensions 420 can enable an interference fit between the gasket 260 and the sprinkler 104, which can help prevent the gasket 260 from falling off the sprinkler 104 prior to installation in fitting 280 even as the orientation of the sprinkler 104 is modified (e.g., if the sprinkler 104 is turned upside down). The extensions 420 can be positioned symmetrically around the inner surface 412 (e.g., within a threshold angle of being equally angularly spaced one another; the threshold angle can be less than ten degrees, less than five degrees, less than one degree). The extensions can be positioned asymmetrically. As depicted in FIG. 5, the threads of the engagement member 240 may form part of the gasket receiver 256 (e.g., the engagement member 240 can be on the surface of the gasket receiver 256), and the extensions 420 can be received between the threads of the engagement member 240 (e.g., in voids 504) to enable the interference fit.

Figure 6:
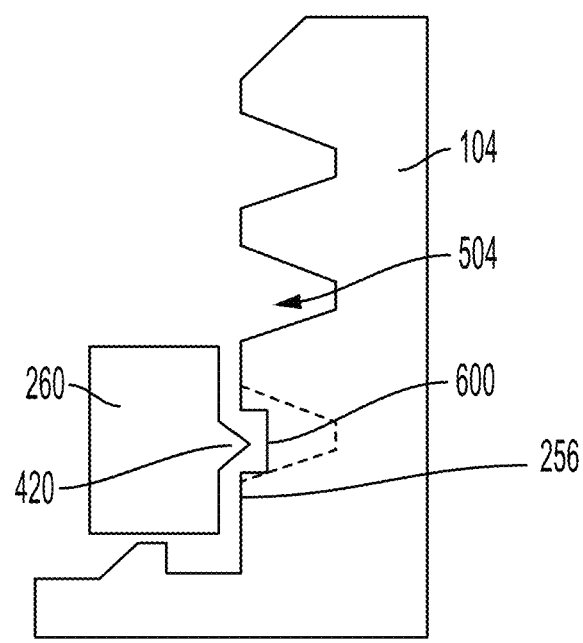
FIG. 6 depicts an example of a gasket and a sprinkler.

FIG. 6 depicts an example of the sprinkler 104 including a groove 600 formed on the gasket receiver 256 between the engagement member 240 and the extension 320 of the sprinkler 104. The groove 600 can receive the extensions 420 of the gasket 260 to enable the interference fit between the sprinkler 104 and the gasket 260. As depicted in FIG. 6, the groove can have a depth less than a depth of the voids 504 formed between the threads of the engagement member 240.

Figure 7:
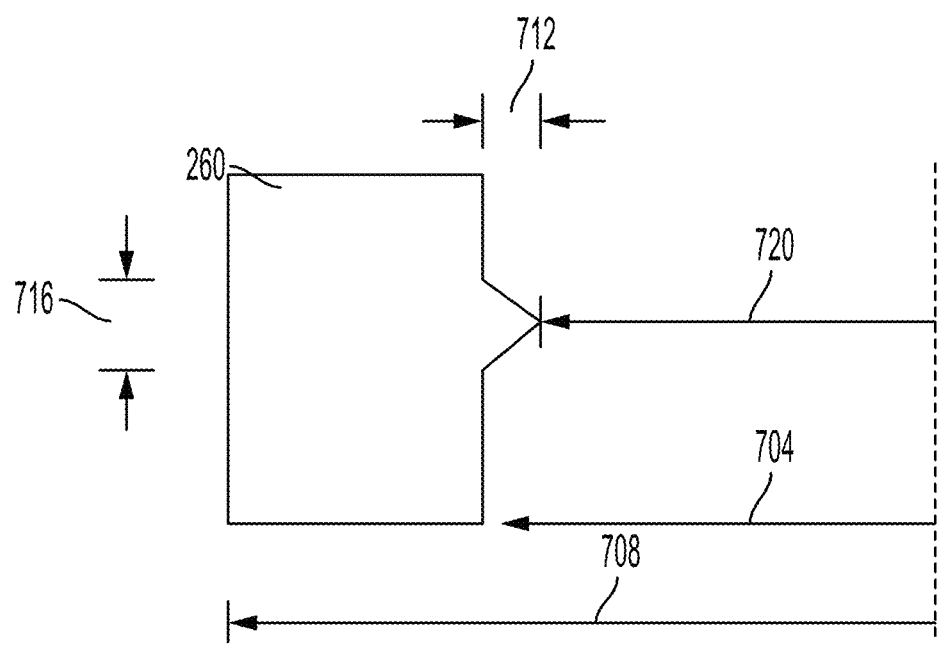
FIG. 7 depicts an example of a gasket.

FIG. 7 depicts dimensions of the gasket 260, which can enable the gasket 260 to effectively seal the sprinkler 104 with the fitting 280. The gasket 260 can define an inner radius 704 and an outer radius 708 relative to a gasket axis 700 (the gasket axis 700 can align with the longitudinal axis 202 when the gasket 260 is coupled with the sprinkler 104).

The inner radius 704 can be greater than or equal to 0.75 inches and less than or equal to 2.5 inches. The inner radius 704 can be greater than or equal to 1 inch and less than or equal to 2 inches. The inner radius 704 can be greater than or equal to 1.2 inches and less than or equal to 1.5 inches. The inner radius 704 can be 1.38 inches.

The outer radius 708 can be greater than or equal to 1 inch and less than or equal to 3 inches. The outer radius 708 can be greater than or equal to 1.2 inches and less than or equal to 2.2 inches. The outer radius 708 can be greater than or equal to 1.4 inches and less than or equal to 1.6 inches. The outer radius 708 can be 1.5 inches. A ratio of the inner radius 704 to the outer radius 708 can be greater than 1:1.05 and less than 1:1.5. The ratio can be 1:1.09.

The extension 420 of the gasket 260 can define a length 712 and a height 716, such as to enable the interference fit between the gasket 260 and the sprinkler 104. The length 712 can be greater than 0.01 inches and less than 0.1 inches. The length 712 can be greater than inches and less than 0.05 inches. The length 712 can be 0.04 inches.

The height 716 can be greater than 0.02 inches and less than 0.12 inches. The height 716 can be greater than 0.03 inches and less than 0.09 inches. The height 716 can be greater than 0.04 inches and less than 0.08 inches. The height 716 can be 0.06 inches. A ratio of the length 712 to the height 716 can be greater than 1:1.1 and less than 1:2. The ratio can be 1:1.3.

The extension 420 can define an inner radius 720. The inner radius 720 can enable the extension 420 to be received by the engagement member 240 of the sprinkler 104. The inner radius 720 can be greater than 1 inch and less than two inches. The inner radius 720 can be greater than 1.2 inches and less than 1.5 inches. The inner radius 720 can be greater than 1.3 inches and less than 1.4 inches. The inner radius 720 can be 1.34 inches.

Figure 8:
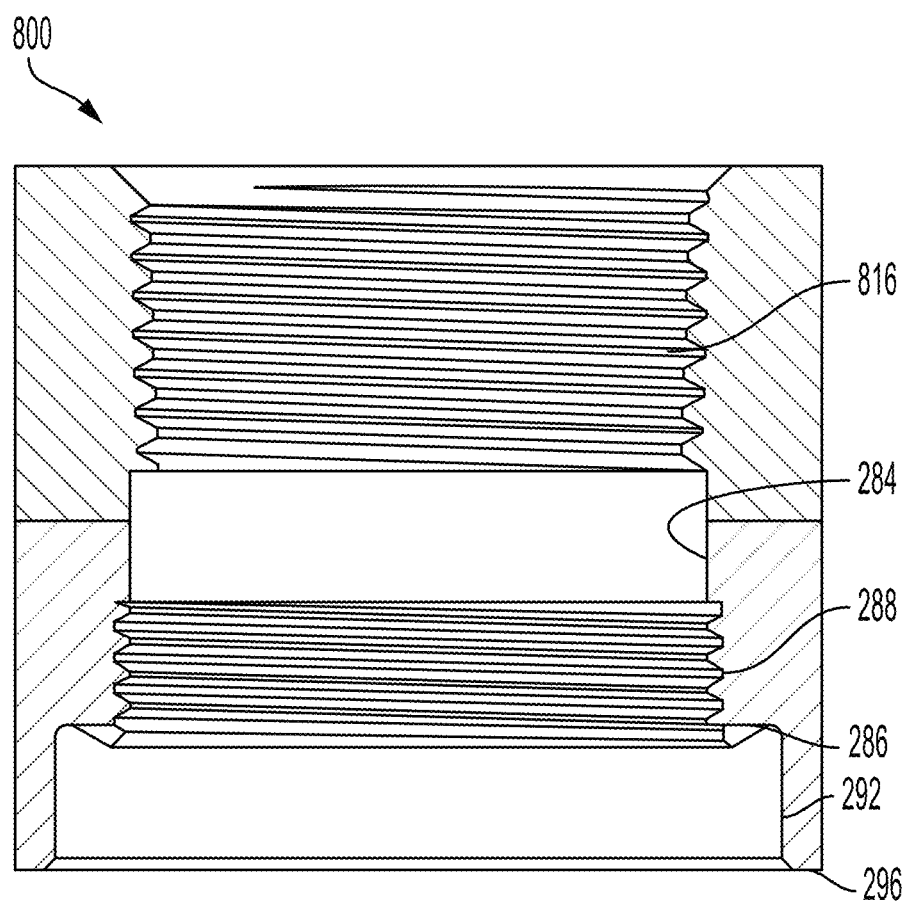
FIG. 8 depicts an example of a cross-section view of a fitting that can receive a gasket and a remote fitting.

FIG. 8 depicts an example of a fitting 800. The fitting 800 can incorporate features of and be used to implement the fitting 280 described with reference to FIGS. 2A and 2B. The fitting 800 can be attached to the piping 108 by welding or engagement with an engagement member of the piping 108 and second engagement member 816. The fitting 800 can enable toolless installation of a remote fitting to the fitting 800, along with connection of the remote fitting with the piping 108. Various fittings and adapters described herein, including fitting 800, can be used to convert threads from NPT to other thread geometries described herein for different fittings and geometries, facilitating quick connections and/or retrofitting. For example, the fitting 800 can be used as a female-female converter.

The fitting 800 can include the inner wall 284 defining the fitting engagement member 288. The fitting engagement member 288 can engage an engagement member of a remote fitting (e.g., the at least one engagement member 240 of the sprinkler 104 or of the fitting 900 described with reference to FIG. 9). The fitting engagement member 288 can have a straight thread, such as to facilitate toolless coupling of the remote fitting with the fitting 800. The fitting engagement member 288 can have female threads having pitch compatible to be engaged with external (male) threads provide on various sprinklers described herein.

The fitting 800 can include the end wall 292. The end wall 292 can have a greater inner diameter than the fitting engagement member 288. The end wall 292 can receive the remote fitting, as well as a gasket (e.g., gasket 260 described with reference to FIGS. 2A, 2B, and 3-7) positioned on an outer wall of the remote fitting to seal the fitting 800 and the remote fitting. For example, the gasket can be received between the end wall 292 and the remote fitting and outside of contact between the fitting engagement member 288 and an engagement member of the remote fitting, enabling the gasket to seal the connection between the fittings without being exposed to fluid flow between the fittings.

The fitting 800 can include a second engagement member 816. The second engagement member 816 can enable threaded engagement between the fitting 800 and components such as piping 108. The second engagement member 816 can include at least one of an interference thread or national pipe thread (NPT). The second engagement member 816 can be spaced from the fitting engagement member 288 along the inner wall 284.

Figure 9:
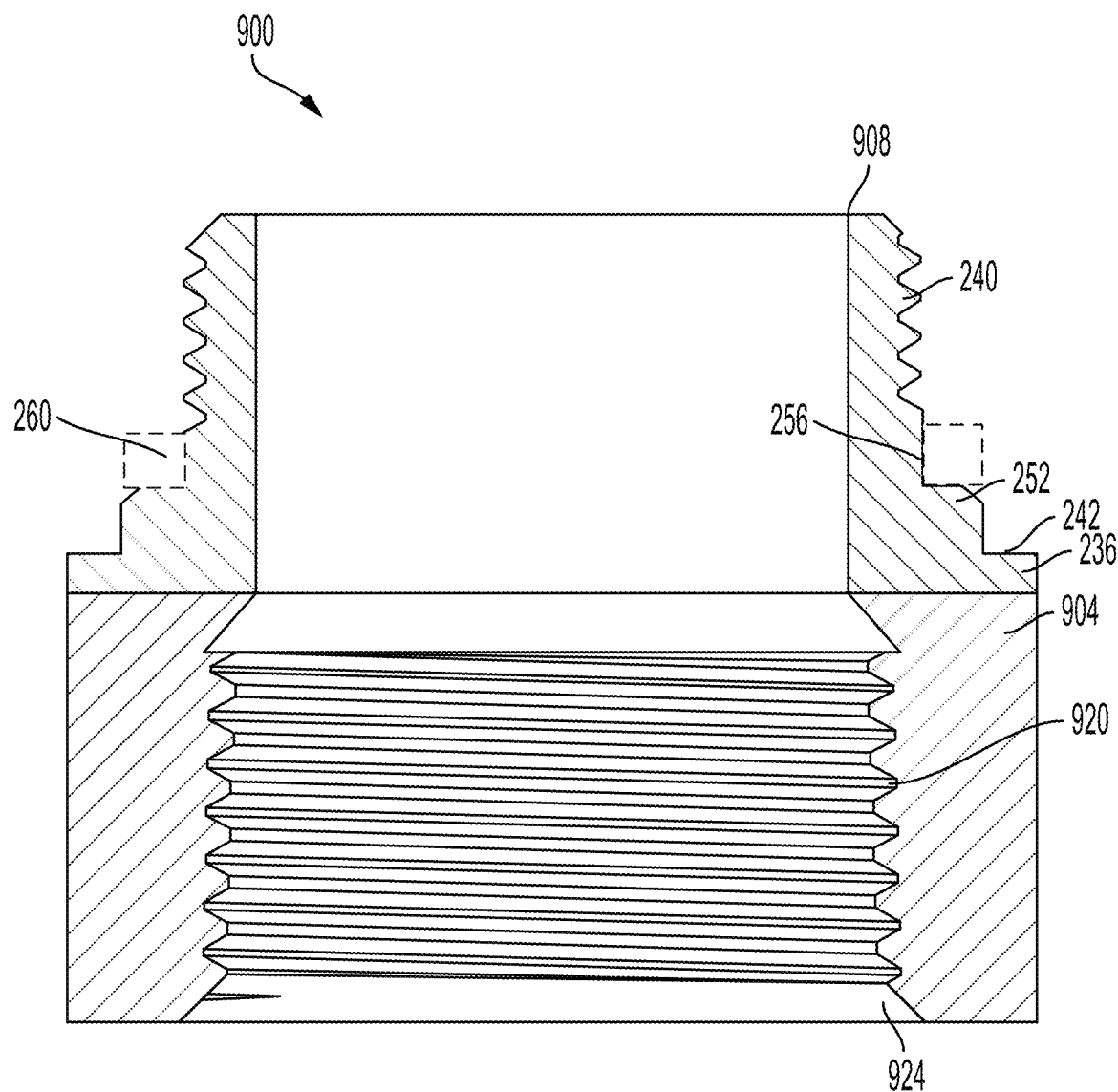
FIG. 9 depicts an example of a cross-section view of a fitting that can be received by a remote fitting.

FIG. 9 depicts an example of a fitting 900. The fitting 900 can be connected with the fitting 800. For example, a toolless installation can be performed in which the fitting 900 is moved into the fitting 800, and threaded to engage with the fitting engagement member 288, while a gasket (e.g., gasket 260 described with reference to FIGS. 2A, 2B, and 3-7) is positioned between the fitting 800 and the fitting 900. The fitting 900 can incorporate features of the sprinkler 104; for example, the sprinkler 104 can be an example of the fitting 900. The fitting 900 can be implemented as various types of fittings, including but not limited to sprinklers, tee joints, cross joints, elbow joints, pipe outlets, and pipe couplings. The fittings 800, 900 can be provided as a piping assembly. The fitting 900 can include a male RIS engagement member (engagement member 240) and a female NPT engagement member (e.g., engagement member 920); the fitting 900 may also be formed to have a female RIS engagement member and male NPT engagement member.

The fitting 900 includes a body 904 having the at least one flange 236 extending from the body 904 to an inlet end 908. The body 904 can include or be coupled with various components, such as sprinklers, pipe joints, or pipe couplings. For example, as depicted in FIG. 9, the body 904 can define an inner engagement member 920 extending to an outlet end 924 to connect a first remote fitting (e.g., fittings 280, 800) with the inlet end 908 and a second remote fitting with the outlet end 924. The inner engagement member 920 can include at least one of an interference thread or national pipe thread (NPT). The threads of the inner engagement member 920 can be female threads. The second remote fitting can be a standard ESFR sprinkler having engageable NPT threads or a piping having NPT threads.

The fitting 900 includes the at least one engagement 240 between the at least one flange 236 and the inlet end 908. The inlet end 908 can be inserted into a remote fitting (e.g., fittings 280, 800) and connected with the remote fitting, such as by threaded engagement between the at least one engagement member 240 and a corresponding engagement member of the remote fitting. The engagement member 240 can have a straight threads, such as to facilitate toolless coupling of the remote fitting with the fitting 900. The threads of the engagement member 240 can be male threads.

The at least one flange 236 can incorporate features of the at least one flange 236 of the sprinkler 104. For example, the at least one flange 236 is depicted to include a first flange 236 and a second flange 252. The at least one flange 236 can receive a gasket (e.g., gasket 260 described with reference to FIGS. 2A, 2B, and 3) on the at least one flange 236, such as adjacent to gasket receiver 256 (which can position the gasket away from the engagement member 240, such as radially outward from the engagement member 240). The first flange 236 can be sized to abut a remote fitting into which the inlet end 908 is inserted, such as by extending further radially outward than the engagement member 916, to prevent overtightening and overcompression of the gasket 260 between the fitting 900 and the remote fitting.

Figure 10:
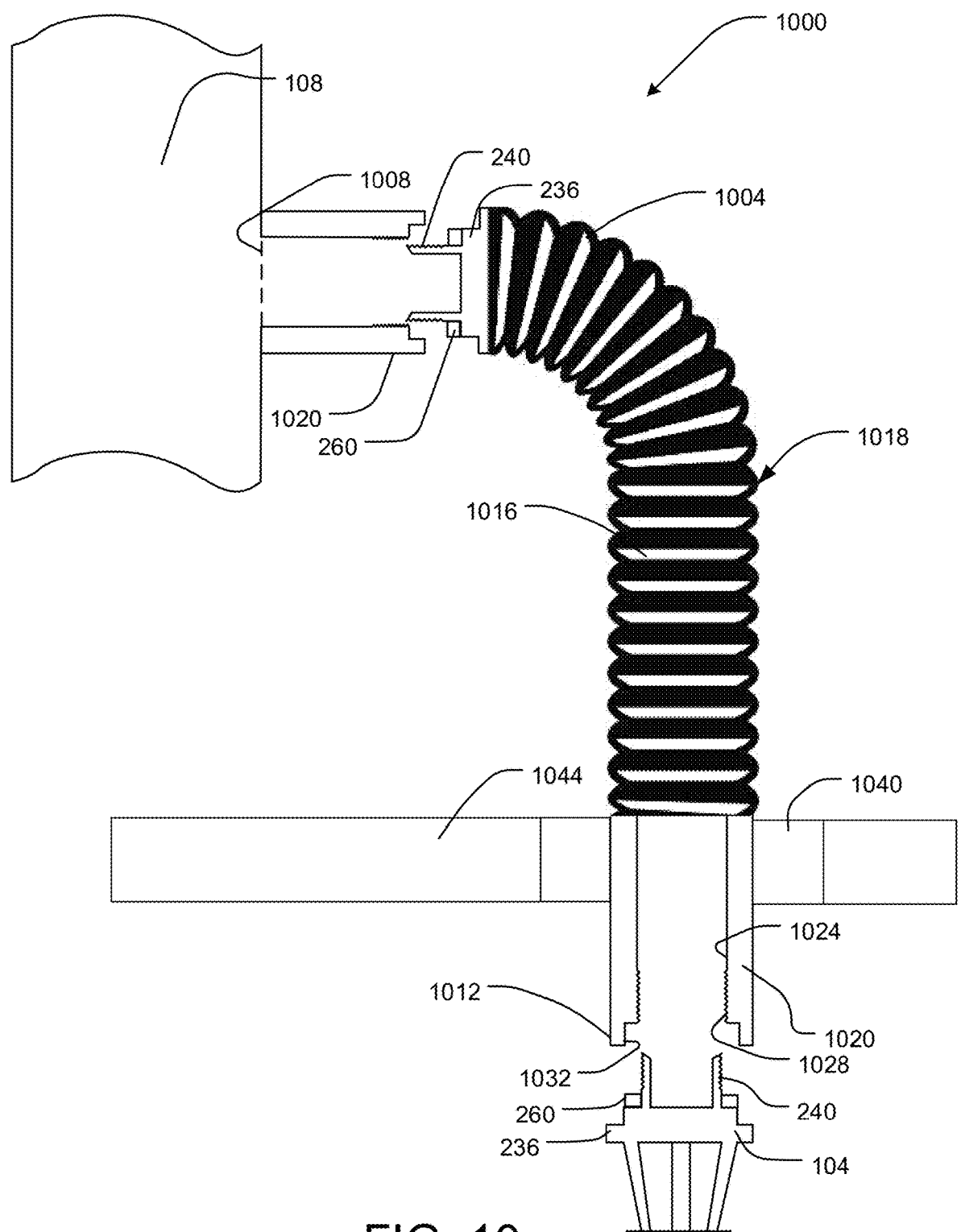
FIG. 10 depicts an example of a sprinkler system including a flexible hose coupled with a sprinkler.

FIG. 10 depicts an example of a fitting assembly 1000 that can be implemented using features of various systems and devices described herein. The fitting assembly 1000 can include a flex hose fitting 1004 that can incorporate features of the fittings and/or adapters 280, 800, 1200, 1300, facilitating tool-free installation of a fitting, such as the sprinkler 104 or the fitting 900, with the flex hose fitting 1004.

Installing sprinklers with flexible hoses ("flex hoses") can enable more flexible positioning of the sprinkler, including in implementations where the flex hose spaces the sprinkler from a fluid-filled portion of the sprinkler system. The flex hose can be secured relative to a structure, such as a ceiling using clamps, rails, or other support members. As an example of an installation procedure, a sprinkler can be connected with the flex hose at ground level (e.g., using a tool, such as a wrench), the flex hose can be raised to ceiling level so that an opposite end of the flex hose can be connected with a pipe header at or around ceiling level, and the flex hose can be swung into clamping structures, which can be fastened with the flex hose. Such procedures can require an installer to handle several components and tools above head level; in addition, moving the components can result in contact between the sprinkler and walls or other components. By using the flex hose fitting 1004 to connect with the sprinkler 104, the sprinkler 104 can be installed after putting the flex hose fitting 1004 in position and securing the flex hose fitting 1004 using clamps or other fasteners, and can be installed without using tools such as wrenches or pipe tape. For example, the connections enabled by the flex hose fitting 1004 with at least one of the sprinkler 104 at a first end of the flex hose fitting 1004 and a pipe header (e.g., piping 108) at a second end of the flex hose fitting 1004 can each be performed without tools. This can facilitate an installation process in which the flex hose fitting 1004 is connected (e.g., by hand) with the piping 108, then secured into a target position using clamps or other fasteners, and then the sprinkler 104 is connected (e.g., by hand) with the flex hose fitting 1004. In installation processes requiring multiple sprinklers 104 to be installed, each respective flex hose fitting 1004 can be coupled with the piping 108 and secured using clamps or other fasteners, before each sprinkler 104 is then installed (e.g., by hand) with each respective flex hose fitting 1004.

As depicted in FIG. 10, the flex hose fitting 1004 extends from an inlet end 1008 that can connect with the piping 108 to an outlet end 1012 that can connect with the sprinkler 104, and can include a hose portion 1016 between the inlet end 1008 and the outlet end 1012. FIG. 10 is described based on connecting the sprinkler 104 with the outlet end 1012; the fitting 900 (e.g., various types of fittings incorporating features of the fitting 900, such as joints, pipe couplings, or pipe outlets) can be connected with the outlet end 1012. The inlet end 1008 can be connected with the piping 108 using various components, such as adapter 1020 (e.g., a welded or strap-on pipe outlet, tee fitting, or elbow fitting incorporating features of the fittings and/or adapters 280, 800, 1200, 1300), a grooved connection (e.g., to be coupled using a grooved fitting, such as a grooved pipe coupling), or by welding.

The hose portion 1016 can be formed by a hose. The hose portion 1016 can be formed by a resilient material, such as rubber, or can be formed by a corrugated material, such as steel, to allow the inlet end 1008 to be positioned in various poses (e.g., positions and/or orientations) relative to the outlet end 1012, while allowing fluid to flow from the inlet end 1008 to the outlet end 1012. The hose portion 1016 can include a grooved outer surface 1018 (e.g., a grooved surface formed by the material of the hose or an outer sleeve positioned around at least a portion of the hose). The hose portion 1016 can incorporate features of various flexible hoses described in PCT Publication No. WO 2021/003153, such as a braided outer tubing, which can be made of a metal.

Figure 11A:
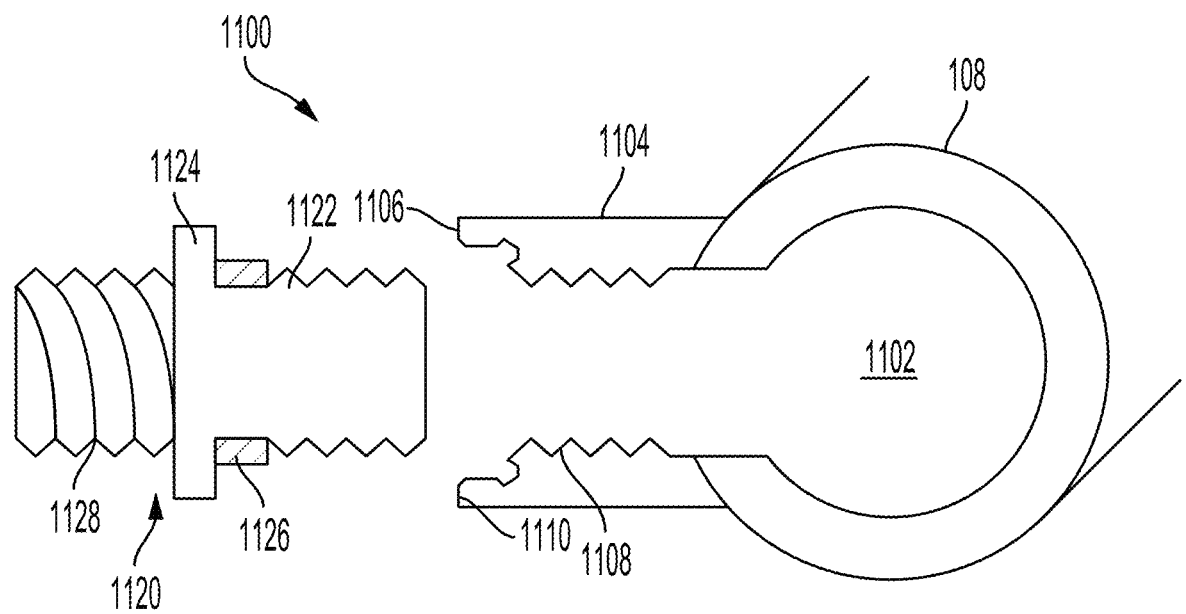
FIGS. 11A and 11B depict an example of connections to form an installation of a sprinkler system including a flexible hose.
Figure 11B:
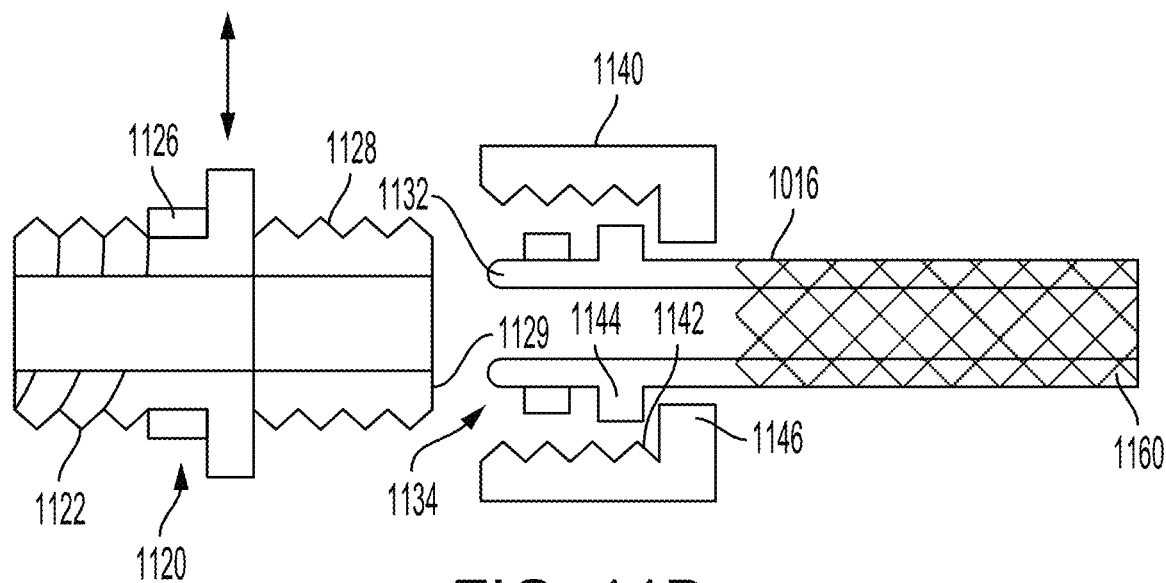

The flex hose fitting 1004 can include at least one adapter 1020 (e.g., located at at least one of the inlet end 1008 and the outlet end 1012; forming at least one of the inlet end 1008 and the outlet end 1012). The adapter 1020 can be integrally or monolithically formed with the flex hose fitting 1004, which can reduce an amount of connections required to be performed to install the sprinkler 104. The adapter 1020 can be coupled with the flex hose fitting 1004 (e.g., the outlet end 1012 can be a hose connector or reducer and the adapter 1020 can incorporate features of the fitting 800, such as the second engagement member 816, that can connect with the hose connector; the adapter 1020 can be coupled with the flex hose fitting 1004 in an assembly such as depicted in FIG. 11). The adapter 1020 can incorporate features of the fittings 280, 800 to enable tool-free (e.g., wrench-free, manual) installation of the sprinkler 104 with the adapter 1020. The adapter 1020 can be adjacent to the hose portion 1016. The adapter 1020 can be spaced from the hose portion 1016, such as by one or more additional hose portions or other tubing of the flex hose fitting 1004, such as tube portions that may be less flexible than the hose portion 1016.

The adapter 1020 can include an inner wall 1024 defining an engagement member 1028. The inner wall 1024 can incorporate features of the inner wall 284, and the engagement member 1028 can incorporate features of the fitting engagement member 288. The engagement member 1028 can be a threaded member, such as straight thread, to enable hand tightening of a connection between the adapter 1020 and the sprinkler 104.

The adapter 1020 can include a receiver 1032 to receive the sprinkler 104. The receiver 1032 can incorporate features of the inner wall edge 286, end wall 292, and outer edge 296. The receiver 1032 can have a greater inner diameter than the engagement member 1028. The receiver 1032 can receive the sprinkler 104 and the gasket 260 between the receiver 1032 and the sprinkler 104. For example, the sprinkler 104 and the gasket 260 can be positioned in the receiver 1032, and the sprinkler 104 can be rotated to engage the engagement member 1028 with the engagement member 240 of the sprinkler 104. At the inlet end 1008 of the flex hose fitting 1004, the adapter 1020 can be coupled with the piping (e.g., welded, connected using threaded engagement members, adhered using adhesive, coupled with a pipe coupling) and with at least one flange 236 coupled with the flex hose 1016, and the gasket 260 can be provided between the at least one flange 236 coupled with the flex hose 1016 and the adapter 1020 to seal the adapter 1020 with the flex hose 1016. The at least one flange 236 can be rotatably coupled with the inlet end 1008 of the flex hose 1016 to facilitate flexible placement of the flex hose fitting 1003.

The fitting assembly 1000 can include a fastener 1040 to fix the flex hose fitting 1004 (and the sprinkler 104) relative to a building structure (not shown), such as a ceiling or wall. The fastener 1040 can include at least one of a clamp, a strap, and a bracket. For example, as depicted in FIG. 10, the fastener 1040 can be a clamp that can be positioned around the flex hose fitting 1004 to secure the flex hose fitting 1004, and can be fixed to at least one rail 1044 that extends from the fastener 1040 to the building structure. The fastener 1040 can include a spring-loaded ratchet, such as to engage the grooved outer surface 1018. For example, in an installation procedure, the flex hose fitting 1004 can be coupled with the piping 108 without using tools, such as by being coupled with a header of the piping 108 using the adapter 1020 coupled with the piping 108. The flex hose 1016 of the flex hose fitting 1004 can be manipulated in space to a target position; for example, an axis through the inlet end 1008 can be aligned in at least one of a different angle and a different plane relative an axis through the outlet end 1012. The fastener 1040 can be coupled with the flex hose fitting 1004, such as to the adapter 1020 of the outlet end 1012 of the flex hose fitting 1004, to secure the position of the outlet end 1012. The sprinkler 104 can be coupled with the outlet end 1012 using various tool-free installation components and procedures described herein, such as components and procedures that allow for push or other manual (e.g., rotational) connections.

FIG. 11 depicts an example of features of an installation 1100 of the fitting assembly 1000. At least some connections of the installation 1100 can be performed without tools. As depicted in FIG. 11, a connector 1104 can be coupled with a header 1102 of the piping 108. The connector 1104 can extend from the piping 108 to an outlet end 1106, and include thread 1108 and a groove 1110 closer to the outlet end 1106 than the thread 1108.

An adapter 1120, which can incorporate features of the adapter 1020, can be coupled with the connector 1104. For example, the adapter 1120 can include thread 1122 to connect with the thread 1108, and a shoulder 1124 to receive a first gasket 1126 to allow the first gasket 1126 to be received in the groove 1110 and seal the adapter 1120 with the connector 1004. The adapter 1120 can include thread 1128 on an opposite end of the adapter 1120 from the thread 1108.

The adapter 1120 can be used to connect with the flex hose 1016, such as to form one or more connections of the flex hose fitting 1004. For example, as depicted in FIG. 11, a fitting 1140 can be positioned around the a first end 1132 of the flex hose 1016 and a second gasket 1134 coupled with the flex hose 1016. The fitting 1140 can include thread 1142 to engage the thread 1128, while the second gasket 1134 is received between the adapter 1120 (e.g., end wall 1129 of the adapter 1120) and a shoulder 1144 of the flex hose 1016. The fitting 1140 can include a wall 1146 that extends radially inward relative to the thread 1142 to engage the shoulder 1144, facilitating (e.g., tool-free) connection between the adapter 1120, second gasket 1134, fitting 1140, and flex hose 1016.

A second end 1160 of the flex hose 1016 can extend to a corresponding adapter 1020, which can be implemented using components of the installation 1100 or various other components described herein, such as to connect the second end 1160 with the sprinkler 104 (e.g., in a tool-free installation).

Figure 12:
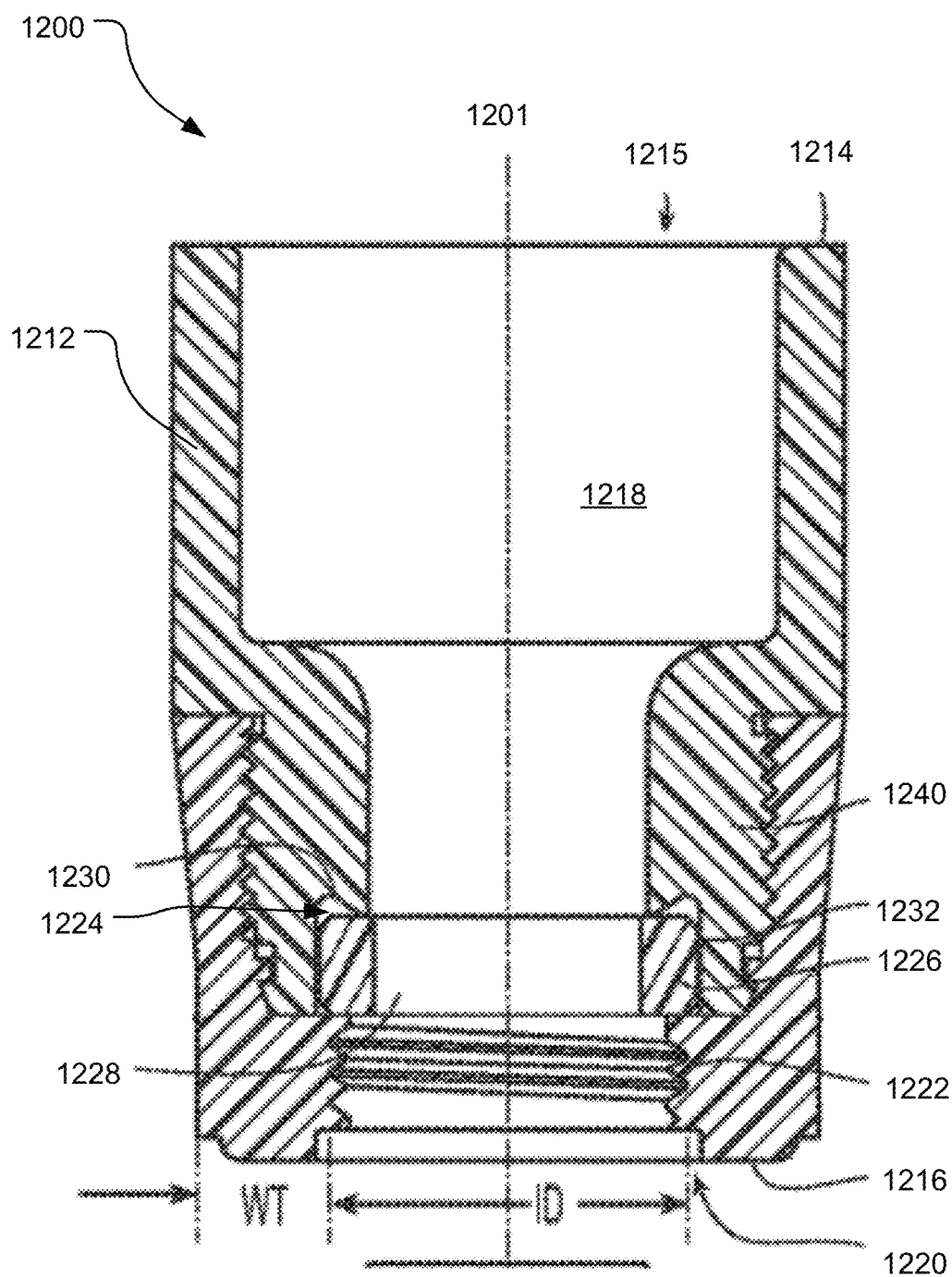
FIG. 12 depicts an example of an adapter to form one or more connections of a sprinkler system including a flexible hose.

FIG. 12 depicts an example of an adapter 1200. The adapter 1200 or components thereof can be used to implement the at least one adapter 1020 of the flex hose fitting 1004.

The adapter 1200 includes a housing 1212 having a first end 1214 and inlet 1215. The inlet 1215 can be part of or coupled with the piping 108 (e.g., where used to implement an inlet end of the flex hose fitting 1004), or can be coupled with or form part of the flex hose 1016 (e.g., where used to implement an outlet end of the flex hose fitting 1004 to be coupled with the sprinkler 104). The adapter 1200 includes a second end 1216. The first end 1214 and second end 1216 can be formed as male or female members to facilitate various forms of installations.

The housing 1212 can be a tubular member, and can have an internal passageway 1218 extending from the first end 1214 to the second end 1216 along longitudinal axis 1201. The adapter 1200 can be a straight fitting, as depicted, and can be formed as a reducer fitting. The adapter 1200 can be formed as an elbow fitting.

The internal passageway 1218 can include a receptacle 1220 formed at the second end 1216, and can include a thread 1222 for a threaded engagement with a remote component. The internal passageway 1218 can be at least partially defined by a stepped portion 1240 of the housing 1212 in which the diameter of the internal passageway 1218 decreases.

The housing 1212 can include a gasket chamber 1224 between the first end 1214 and the thread 1222. The gasket chamber 1224 and the receptacle 1220 can be aligned with one another and centered about the longitudinal axis 1201. An internal wall 1232 of the housing 1212 can at least partially form the gasket chamber 1224.

A gasket 1226 can be disposed in the gasket chamber 1224. The gasket 1226 can be an annular member having a central opening through which fluid can flow. The gasket 1226 can have an unloaded state and a loaded state within the gasket chamber 1224. More specifically, without a sprinkler in the receptacle 1220 or fully engaged in the receptacle 1220, the gasket 1226 can be in its unloaded state in which the gasket. In the loaded state, the gasket 1226 can form a fluid tight seal with the sprinkler 104 that is advanced into the receptacle 1220 to press the gasket 1226 against bearing surfaces of the gasket chamber 1224.

The thread 1222 can be a straight thread. By using straight thread 1222 for receipt of a remote component (e.g., sprinkler 104), which may include tapered thread, a proper fluid tight seal can be formed upon a squared contact between the remote component and the gasket 1226, without the use of wrenches or other tools. The receptacle 1220 can have an internal diameter ID, and a wall thickness WT to an outer surface of the housing 1212.

The gasket chamber 1224 can have two regions: (i) a holding portion 1228 and (ii) an expansion portion 1230. The holding portion 1228 can define a first volume in which the gasket 1226 is completely housed in the unloaded state of the gasket 1226. The volume defined by the holding portion 1228 can be cylindrical for holding the annular shaped gasket 1226. The expansion portion 1230 can define a second volume to receive a displaced portion of the gasket 1226 in the loaded state of the gasket 1226. The expansion portion 1230 can define an annular void or gap located above or axially adjacent the unloaded gasket 1226 for receipt of the displaced gasket portion in a loaded state of the gasket 1226.

Figure 13:
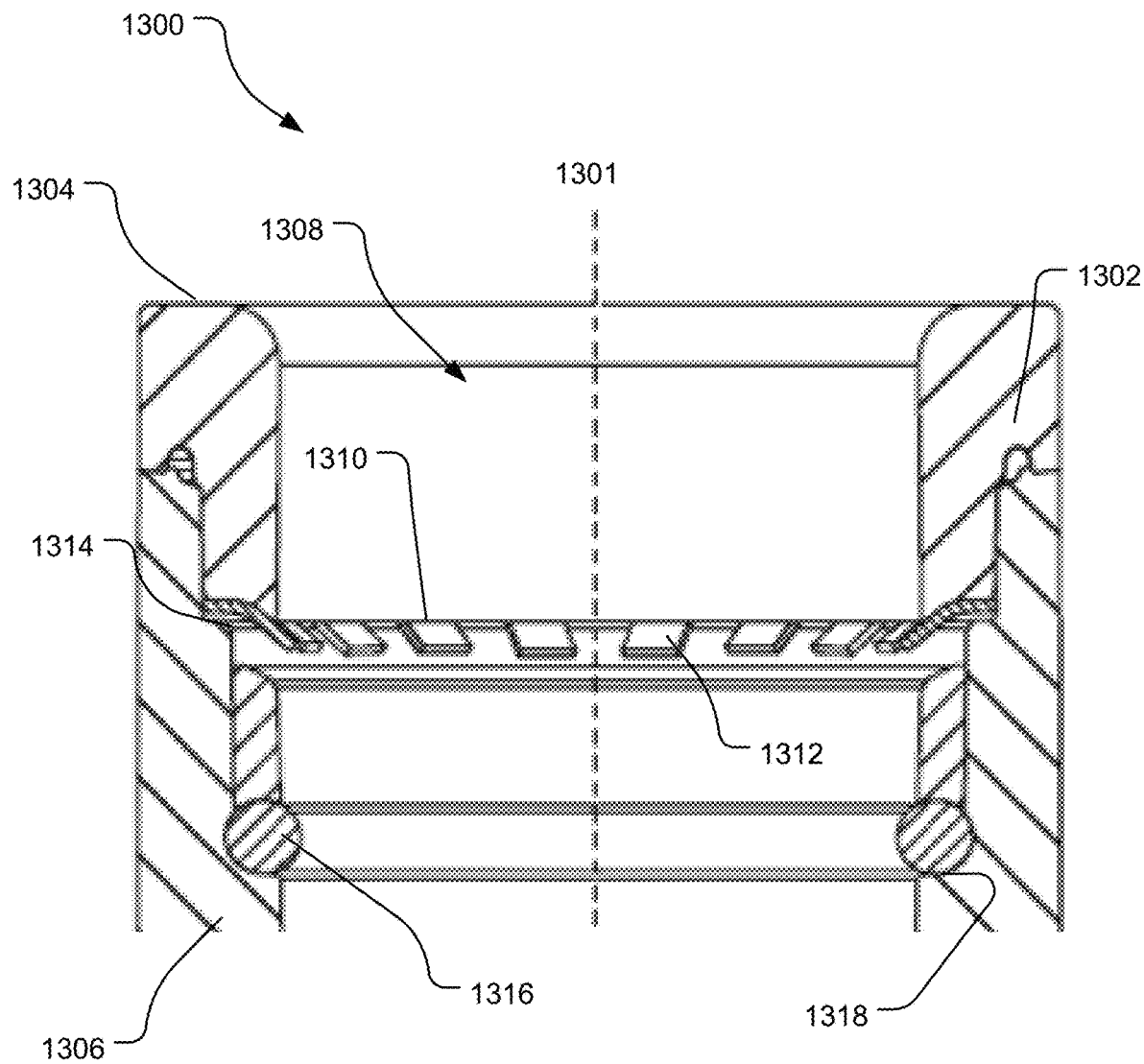
FIG. 13 depicts an example of an adapter to form one or more connections of a sprinkler system including a flexible hose.

FIG. 13 depicts an example of an adapter 1300. The adapter 1300 or components thereof can be used to implement the at least one adapter 1020 of the fitting assembly 1000. The adapter 1300 can enable a push connection between the flex hose fitting 1004 and one or more remote components, such as the sprinkler 104 or piping 108. For example, the adapter 1300 can enable the sprinkler 104 to be pushed into connection with the outlet end 1012 of the flex hose fitting 1004, the inlet end 1008 of the flex hose fitting 1004 to be pushed into connection with piping 108 (e.g., with a connector attached to the piping 108), or various combinations thereof to enable tool-free installation.

As depicted in FIG. 13, the adapter 1300 can have a body 1302 that extends along a longitudinal axis 1301 from a first end 1304 to a second end 1306. The second end 1306 can coupled with or formed as part of the flex hose fitting 1004. The body 1302 can define an internal passageway 1308 extending along the longitudinal axis 1301 from the first end 1304 to the second end 1306. The body 1302 can be made from one or more integral or separate and coupled portions. A remote component, such as the sprinkler 104 or a piping component or adapter, can be inserted through the first end 1304 into the internal passageway 1308.

The adapter 1308 can include at least one ring 1310. The ring 1310 can include a plurality of teeth 1312. The plurality of teeth 1312 can be spaced along the ring 1310 and at least one of oriented, shaped, and made from a material to facilitate a push connection with the sprinkler 104 or other remote component. For example, the plurality of teeth 1312 can receive a thread of the sprinkler 104 to allow the sprinkler 104 to be pushed through the first end 1304 past the teeth 1312, and can engage the thread to prevent movement of the sprinkler 104 back towards the first end 1304. The teeth 1312 can be shaped to extend inward toward the longitudinal axis 1301, and towards the second end 1306 relative to the first end 1304. The body 1302 can include a first slot 1314 to receive the ring 1310, such as to prevent movement of the ring 1310 along the longitudinal axis 1301 while the sprinkler 104 or other remote component is being pushed against the ring 1310.

The adapter 1300 can include a seal 1316, such as a gasket, to form a seal with the sprinkler 104 or other remote component. The seal 1318 can be received in a second slot of the body 1302, which can be located between the first slot 1314 and the second end 1306 to allow the sprinkler 104 or other remote component to be pushed into connection with the adapter 1300 and then sealed with the seal 1316.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A hose fitting, comprising:
a hose, comprising:
an inlet hose end;
a flange coupled with the inlet hose end;
a threaded member extending away from the flange;
an inlet gasket on the flange;
an outlet hose end; and
a hose portion disposed between the inlet hose end and the outlet hose end, the hose portion comprising at least one of a rubber material, a corrugated material, or a braided metal tubing;
an adapter, comprising:
an internal passageway between a first adapter end coupled with the outlet hose end and a second adapter end, the outlet hose end between the first adapter end and the inlet hose end, the second adapter end having a receiver to receive a sprinkler;
a threaded engagement member between the first adapter end and the second adapter end, the threaded engagement member having a lesser inner diameter than the receiver;
a gasket; and
a gasket chamber formed in the internal passageway between the first adapter end and the threaded engagement member, the gasket chamber having a holding portion to receive the gasket in an unloaded state and an expansion portion to receive a displaced portion of the gasket in a loaded state of the gasket from pressing of the gasket by the sprinkler; and
a second adapter identical to the adapter, wherein the second adapter is attached to the threaded member of the hose.

2. The hose fitting of claim 1, comprising:
the gasket is an annular member.

3. The hose fitting of claim 1, comprising:
the threaded engagement member comprises straight thread to enable hand tightening of the sprinkler with the adapter.

4. The hose fitting of claim 1, comprising:
the adapter is integrally formed with the hose.

5. The hose fitting of claim 1, comprising:
the adapter comprises a straight fitting, a reducer fitting, or an elbow fitting.

6. A fire protection sprinkler assembly, comprising:
a hose comprising an inlet hose end, a flange coupled with the inlet hose end, a threaded member extending from the flange, an inlet gasket on the flange; and an outlet hose end;
an adapter, comprising:
an internal passageway disposed between a first adapter end coupled with the outlet hose end and a second adapter end, the first adapter end between the outlet hose end and the second adapter end; and
a threaded engagement member between the first adapter end and the second adapter end;
a second adapter identical to the adapter, wherein the second adapter is attached to the threaded member of the hose; and
a sprinkler received in the second adapter end and coupled with the threaded engagement member.

7. The fire protection sprinkler assembly of claim 6, comprising:
the hose comprises at least one of a rubber material, a corrugated material, or a braided metal tubing.

8. The fire protection sprinkler assembly of claim 6, comprising:
a gasket in the adapter between the threaded engagement member and the first adapter end.

9. The fire protection sprinkler assembly of claim 6, comprising:
a gasket chamber formed in the internal passageway between the first adapter end and the threaded engagement member; and
a gasket in the gasket chamber.

10. The fire protection sprinkler assembly of claim 6, comprising:
the adapter is adjacent to the hose.

11. The fire protection sprinkler assembly of claim 6, comprising:
the threaded engagement member comprises straight thread.

12. The fire protection sprinkler assembly of claim 6, comprising:
a gasket chamber formed in the internal passageway between the first adapter end and the threaded engagement member, the gasket chamber having a holding portion to receive a gasket in an unloaded state and an expansion portion to receive a displaced portion of the gasket in a loaded state of the gasket from pressing of the gasket by the sprinkler.

13. A hose assembly, comprising:
a hose comprising at least one of a resilient material, a corrugated material, or a braided metal tubing, the hose comprising an inlet hose end, a shoulder coupled with the inlet hose end, a threaded member extending from the shoulder, an inlet gasket on the shoulder, and an outlet hose end opposite the inlet hose end;
an adapter, comprising:
a first end coupled with the outlet hose end, a second end forming a receiver configured to receive a sprinkler, the first end between the hose and the receiver, a threaded engagement member between the receiver and the first end, and a gasket chamber to receive a gasket between the first end and the threaded engagement member; and
a second adapter identical to the adapter, wherein the second adapter is attached to the threaded member of the hose.

14. The hose assembly of claim 13, comprising:
the gasket chamber has a holding portion to receive the gasket in an unloaded state and an expansion portion to receive a displaced portion of the gasket in a loaded state of the gasket from pressing of the gasket by a sprinkler.

15. The hose assembly of claim 13, comprising:
the threaded engagement member comprises straight thread.

16. The hose assembly of claim 13, comprising:
the adapter is a straight fitting.

\* \* \* \* \*